US009042602B2

(12) United States Patent  (10) Patent No.: US 9,042,602 B2
Pirim  (45) Date of Patent: *May 26, 2015

(54) IMAGE PROCESSING APPARATUS AND METHOD

(71) Applicant: Image Processing Technologies LLC, Suffern, NY (US)

(72) Inventor: Patrick Pirim, Paris (FR)

(73) Assignee: Image Processing Technologies, LLC, Suffern, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,817

(22) Filed: Aug. 1, 2014

(65) Prior Publication Data

US 2014/0355833 A1    Dec. 4, 2014

Related U.S. Application Data

(60) Continuation of application No. 14/215,358, filed on Mar. 17, 2014, which is a continuation of application No. 12/620,092, filed on Nov. 17, 2009, now Pat. No. 8,805,001, which is a continuation of application No.

(Continued)

(51) Int. Cl.
*G06K 9/00* (2006.01)
*G06T 7/20* (2006.01)
(Continued)

(52) U.S. Cl.
CPC ............ *G06T 7/2033* (2013.01); *G06K 9/6212* (2013.01); *G06K 9/4642* (2013.01); *G06T 7/0042* (2013.01); *G06T 2207/20104* (2013.01)

(58) Field of Classification Search
None
See application file for complete search history.

(56) References Cited

U.S. PATENT DOCUMENTS 3,725,576 A    4/1973   Crawford et al.
3,760,377 A    9/1973   Attridge et al.

(Continued)

FOREIGN PATENT DOCUMENTS

EP    0046110    2/1982
EP    0380659    8/1990

(Continued)

OTHER PUBLICATIONS

"British firm has eye on the future", Business & Technology (Nov. 18, 1997) 4th Edition.

(Continued)

*Primary Examiner* — Nancy Bitar
(74) *Attorney, Agent, or Firm* — Novak Druce Connolly Bove + Quigg,LLP

(57) ABSTRACT

A method and apparatus for localizing an area in relative movement and for determining the speed and direction thereof in real time is disclosed. Each pixel of an image is smoothed using its own time constant. A binary value corresponding to the existence of a significant variation in the amplitude of the smoothed pixel from the prior frame, and the amplitude of the variation, are determined, and the time constant for the pixel is updated. For each particular pixel, two matrices are formed that include a subset of the pixels spatially related to the particular pixel. The first matrix contains the binary values of the subset of pixels. The second matrix contains the amplitude of the variation of the subset of pixels. In the first matrix, it is determined whether the pixels along an oriented direction relative to the particular pixel have binary values representative of significant variation, and, for such pixels, it is determined in the second matrix whether the amplitude of these pixels varies in a known manner indicating movement in the oriented direction. In each of several domains, histogram of the values in the first and second matrices falling in such domain is formed. Using the histograms, it is determined whether there is an area having the characteristics of the particular domain. The domains include luminance, hue, saturation, speed (V), oriented direction (D1), time constant (CO), first axis (x(m)), and second axis (y(m)).

14 Claims, 13 Drawing Sheets

Related U.S. Application Data

11/676,926, filed on Feb. 20, 2007, now Pat. No. 7,650,015, which is a division of application No. 09/792,294, filed on Feb. 23, 2001, now Pat. No. 7,181,047, which is a continuation-in-part of application No. 09/230,502, filed as application No. PCT/FR97/01354 on Jul. 22, 1997, now Pat. No. 6,486,909, and a continuation-in-part of application No. PCT/EP98/05383, filed on Aug. 25, 1998.

(51) Int. Cl.
  *G06K 9/62* (2006.01)
  *G06K 9/46* (2006.01)
  *G06T 7/00* (2006.01)

(56) References Cited

U.S. PATENT DOCUMENTS

| | | | |
|---|---|---|---|
| 4,364,089 A | 12/1982 | Woolfson | |
| 4,386,848 A | 6/1983 | Clendenin et al. | |
| 4,706,120 A | 11/1987 | Slaughter et al. | |
| 4,719,584 A | 1/1988 | Rue et al. | |
| 4,783,828 A | 11/1988 | Sadjadi | |
| 4,789,940 A * | 12/1988 | Christian | 700/113 |
| 4,847,786 A | 7/1989 | Wang et al. | |
| 4,868,871 A | 9/1989 | Watson, III | |
| H000713 H | 11/1989 | May et al. | |
| 4,906,940 A | 3/1990 | Greene et al. | |
| 5,008,946 A | 4/1991 | Ando | |
| 5,059,796 A | 10/1991 | Nakamura | |
| 5,088,488 A | 2/1992 | Markowitz et al. | |
| 5,109,425 A | 4/1992 | Lawton | |
| 5,123,055 A * | 6/1992 | Kasdan | 382/134 |
| 5,163,095 A | 11/1992 | Kosaka | |
| 5,164,992 A | 11/1992 | Turk et al. | |
| 5,181,254 A | 1/1993 | Schweizer et al. | |
| 5,247,583 A | 9/1993 | Kato et al. | |
| 5,263,098 A * | 11/1993 | Horikami | 382/128 |
| 5,278,921 A * | 1/1994 | Nakamura et al. | 382/167 |
| 5,280,530 A | 1/1994 | Trew et al. | |
| 5,323,470 A | 6/1994 | Kara et al. | |
| 5,359,533 A | 10/1994 | Ricka et al. | |
| 5,360,968 A | 11/1994 | Scott | |
| 5,384,865 A | 1/1995 | Loveridge | |
| 5,426,684 A | 6/1995 | Gaborski et al. | |
| 5,430,809 A * | 7/1995 | Tomitaka | 382/173 |
| 5,452,367 A | 9/1995 | Bick et al. | |
| 5,473,369 A * | 12/1995 | Abe | 348/169 |
| 5,481,622 A | 1/1996 | Gerhardt et al. | |
| 5,488,430 A | 1/1996 | Hong | |
| 5,500,904 A | 3/1996 | Markandey et al. | |
| 5,521,843 A * | 5/1996 | Hashima et al. | 700/253 |
| 5,546,475 A * | 8/1996 | Bolle et al. | 382/190 |
| 5,565,920 A | 10/1996 | Lee et al. | |
| 5,574,498 A | 11/1996 | Sakamoto et al. | |
| 5,592,226 A | 1/1997 | Lee et al. | |
| 5,592,237 A | 1/1997 | Greenway et al. | |
| 5,604,822 A | 2/1997 | Pearson et al. | |
| 5,608,820 A * | 3/1997 | Vaidyanathan | 382/169 |
| 5,610,653 A * | 3/1997 | Abecassis | 348/170 |
| 5,625,717 A | 4/1997 | Hashimoto et al. | |
| 5,630,037 A | 5/1997 | Schindler | |
| 5,631,697 A | 5/1997 | Nishimura et al. | |
| 5,644,386 A | 7/1997 | Jenkins et al. | |
| 5,684,715 A | 11/1997 | Palmer | |
| 5,694,495 A | 12/1997 | Hara et al. | |
| 5,712,729 A | 1/1998 | Hashimoto | |
| 5,717,784 A | 2/1998 | Yanagishita et al. | |
| 5,774,581 A | 6/1998 | Fassnacht et al. | |
| 5,781,650 A | 7/1998 | Lobo et al. | |
| 5,793,888 A | 8/1998 | Delanoy | |
| 5,798,787 A | 8/1998 | Yamaguchi et al. | |
| 5,812,193 A | 9/1998 | Tomitaka et al. | |
| 5,825,922 A | 10/1998 | Pearson et al. | |
| 5,883,969 A | 3/1999 | Le Gouzouguec et al. | |
| 5,912,980 A * | 6/1999 | Hunke | 382/103 |
| 5,912,994 A | 6/1999 | Norton et al. | |
| 5,930,379 A | 7/1999 | Rehg et al. | |
| 5,982,909 A | 11/1999 | Erdem et al. | |
| 5,982,944 A * | 11/1999 | Vaidyanathan et al. | 382/271 |
| 6,005,493 A | 12/1999 | Taniguchi et al. | |
| 6,037,976 A | 3/2000 | Wixson | |
| 6,049,363 A | 4/2000 | Courtney et al. | |
| 6,084,989 A | 7/2000 | Eppler | |
| 6,148,092 A | 11/2000 | Qian | |
| 6,226,388 B1 * | 5/2001 | Qian et al. | 382/103 |
| 6,256,608 B1 | 7/2001 | Malvar | |
| 6,263,088 B1 | 7/2001 | Crabtree et al. | |
| 6,263,089 B1 | 7/2001 | Otsuka et al. | |
| 6,295,367 B1 | 9/2001 | Crabtree et al. | |
| 6,301,370 B1 | 10/2001 | Steffens et al. | |
| 6,304,187 B1 | 10/2001 | Pirim | |
| 6,312,385 B1 * | 11/2001 | Mo et al. | 600/443 |
| 6,335,985 B1 | 1/2002 | Sambonsugi et al. | |
| 6,339,651 B1 | 1/2002 | Tian et al. | |
| 6,381,363 B1 | 4/2002 | Murching et al. | |
| 6,400,830 B1 | 6/2002 | Christian et al. | |
| 6,434,254 B1 | 8/2002 | Wixson | |
| 6,453,069 B1 | 9/2002 | Matsugu et al. | |
| 6,486,909 B1 | 11/2002 | Pirim | |
| 6,597,738 B1 | 7/2003 | Park et al. | |
| 6,704,045 B1 | 3/2004 | Brett | |
| 6,714,665 B1 | 3/2004 | Hanna et al. | |
| 6,717,518 B1 | 4/2004 | Pirim et al. | |
| 7,181,047 B2 | 2/2007 | Pirim | |
| 7,190,725 B2 | 3/2007 | Pirim | |
| 7,650,015 B2 | 1/2010 | Pirim | |
| 8,116,527 B2 * | 2/2012 | Sabol et al. | 382/103 |
| 8,805,001 B2 * | 8/2014 | Pirim | 382/103 |
| 8,989,445 B2 * | 3/2015 | Pirim | 382/103 |
| 2002/0071595 A1 | 6/2002 | Pirim | |
| 2002/0101432 A1 | 8/2002 | Ohara et al. | |
| 2002/0120594 A1 | 8/2002 | Pirim | |
| 2002/0156753 A1 | 10/2002 | Pirim | |
| 2002/0169732 A1 | 11/2002 | Pirim | |
| 2003/0067978 A1 | 4/2003 | Pirim | |
| 2003/0152267 A1 | 8/2003 | Pirim | |
| 2007/0140526 A1 | 6/2007 | Pirim | |

FOREIGN PATENT DOCUMENTS

| | | |
|---|---|---|
| EP | 0394959 | 10/1990 |
| EP | 0574831 | 12/1993 |
| EP | 2751772 | 1/1998 |
| FR | 2611063 | 8/1988 |
| FR | 2751772 | 1/1998 |
| JP | 06205780 | 7/1994 |
| JP | 11150676 | 6/1999 |
| WO | 9805002 | 2/1998 |
| WO | 9936694 | 7/1999 |
| WO | 9936893 | 7/1999 |
| WO | 9936894 | 7/1999 |
| WO | 0011609 | 3/2000 |
| WO | 0011610 | 3/2000 |
| WO | 0011639 | 3/2000 |
| WO | 0163557 | 8/2001 |

OTHER PUBLICATIONS

"Elektronik revue", Eine Elsevier-Thomas-Publikation, Jahrgang (Mar. 8, 1997) ISSN: 0939-1134.

"Inside the Pentagon's, inside missile defense, an exclusive biweekly report on U.S. missile defense programs, procurement and policymaking", Missile Technology (Aug. 13, 1997) 3(16): 5.

"Le mechanisme de la vision humane dans le silicum", Electronique Le Mensuel des Ingenieurs de Conception (1997) 68: 1157-1151.

"Objectif securite des reseaux", Es Professionnels de Linformatique en Enterprise Magazine (Jan. 1997).

"Realiser un decodeur pour TV numberique", Electronique, Le Mensuel des Ingenieurs de Conception (1997) 66.

"Techniques de lingenieur", Revue Trimestrielle Des (Mar. 1997) 5(40F). ISSN 0994-0758.

(56) References Cited

OTHER PUBLICATIONS

Al Adsani, "For immediate release the generic visual perception processor", (Oct. 10, 1997). (1 page).
Daugman, "Complete discrete 2-D Gabor transforms by neural networks for image analysis and compression", IEEE Transaction on Acoustics, Speech and Signal Processing (1988) 36(7): 1169-14179.
Groupe Revenu Francais, Air & Co, "Un calculateur de perceoption visuelle", Hebdomadaire, (Dec. 6, 1996) Annee No. 1590: 22F.
Grove et al., "Colour based object tracking", IEEE (Aug. 1998). (4 pages).
Gru Svelte, "Premier . . . oeil", Electronicque International Hebdo (Dec. 1996): 245.
Indiveri et al., "System implementation of analog VLSI velocity sensor", IEEE Proceedings of MicroNeuro (1996): 15-22.
Johnson, "Vision chip's circuitry has its eye out for you", Retrieved from http://192.215.107.74/wire/news/1997/09/09013vision.html (3 pages).
Mallat, "A theory for multiresolution signal decomposition: The wavelet representation", IEEE Transactions on Pattern Analysis and Machine Intelligence (1989) 11(7): 674-693.
Parleur, "Un processor de perception visuelle", Des Solutions Electroniques Pour Tous (1997) 25F: 1856.
Revue Trimestrielle, "Instantanes Technique", Techniques de Ingenieur (1997). ISSN: 0994-0758.
Ruedi, "Motion detection silicon retina based on event correlations", IEEE Proceedings of MicroNeuro (1996): 23-29.
Swain et al., "Indexing via color histograms", IEEE (1990): 390-393.
Tomita, Jr. et al., "Hand shape extraction from a sequence of digitized gray-scale images", IECON 20th International Conference on Industrial Electronics, Control and Instrumentation (1994) 3: 1925-1930.
Yamada et al., "Image understanding based on edge hologram method for rear-end collision avoidance system", Vehicle Navigation & Information Systems Conference Proceedings (1994): 445-450.

\* cited by examiner

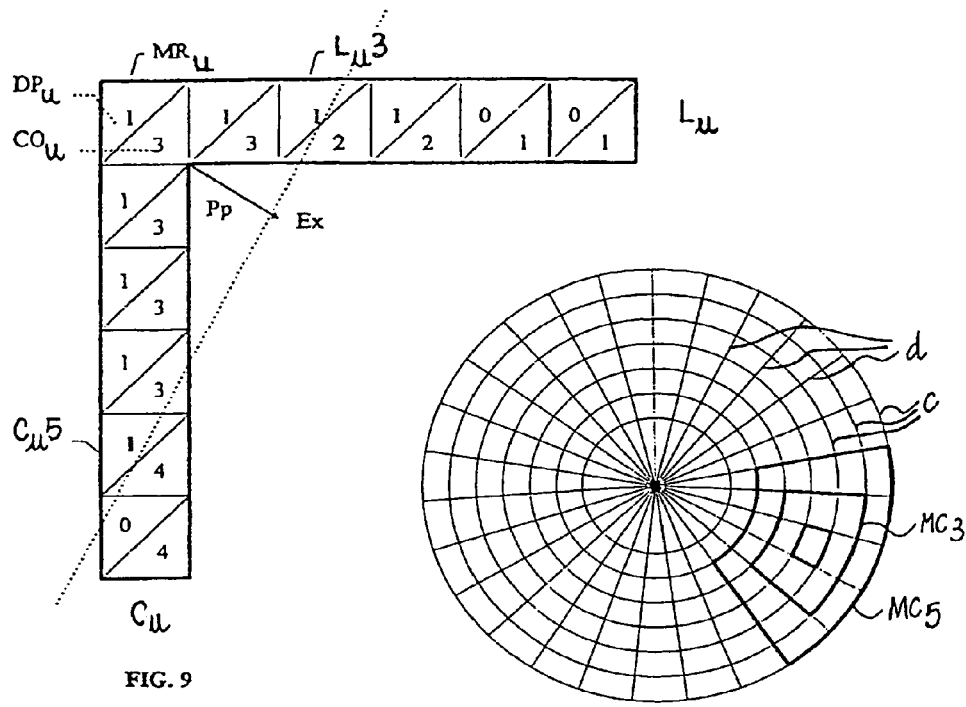
FIG. 9
FIG. 9a
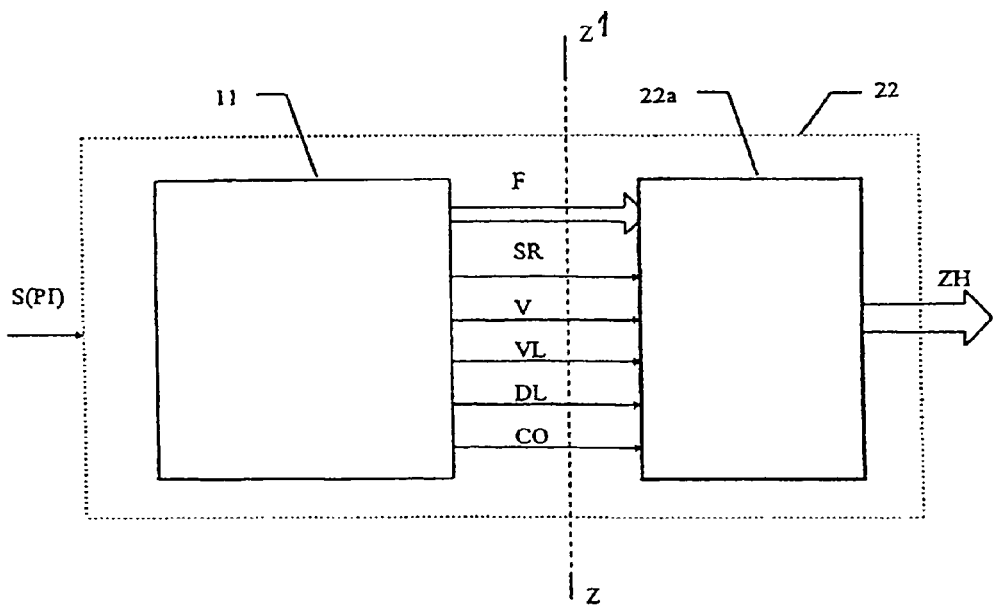
FIG. 10

$$R = \frac{NBPTS}{RMAX}$$

$$1 \leq R \leq STOP$$

IMAGE PROCESSING APPARATUS AND METHOD

CROSS-REFERENCE TO RELATED APPLICATIONS

The present application is a continuation of U.S. application Ser. No. 14/215,358, filed on Mar. 17, 2014.

U.S. application Ser. No. 14/215,358 was a continuation of U.S. application Ser. No. 12/620,092, filed on Nov. 17, 2009.

U.S. application Ser. No. 12/620,092 was a continuation of U.S. application Ser. No. 11/676,926, filed Feb. 20, 2007.

U.S. application Ser. No. 11/676,926 is now U.S. Pat. No. 7,650,015, issued Jan. 19, 2010.

U.S. application Ser. No. 11/676,926 was a divisional of priority to U.S. application Ser. No. 09/792,294, filed Feb. 23, 2001.

U.S. application Ser. No. 09/792,294 is now U.S. Pat. No. 7,181,047, issued Feb. 20, 2007.

U.S. application Ser. No. 09/792,294 is a continuation-in-part of U.S. patent application Ser. No. 09/230,502, filed Sep. 13, 1999.

U.S. patent application Ser. No. 09/230,502 is now U.S. Pat. No. 6,486,909.

U.S. patent application Ser. No. 09/230,502 was a National Stage Entry of application No. PCT/FR97/01354, filed on Jul. 22, 1997.

U.S. patent application Ser. No. 09/230,502 was also a continuation-in-part of application No. PCT/EP98/05383, filed on Aug. 25, 1998.

U.S. patent application Ser. No. 09/230,502 also claims foreign priority to French Patent Application 96 09420, filed Jul. 26, 1996.

BACKGROUND OF THE INVENTION

1. Field of the Invention

The present invention relates generally to an image processing apparatus, and more particularly to a method and apparatus for identifying and localizing an area in relative movement in a scene and determining the speed and oriented direction of the area in real time.

2. Description of the Related Art

The human or animal eye is the best known system for identifying and localizing an object in relative movement, and for determining its speed and direction of movement. Various efforts have been made to mimic the function of the eye. One type of device for this purpose is referred to as an artificial retina, which is shown, for example, in Giocomo Indiveri et. al, Proceedings of MicroNeuro, 1996, pp. 15-22 (analog artificial retina), and Pierre-Francois Ruedii, Proceedings of MicroNeuro, 1996, pp. 23-29, (digital artificial retina which identifies the edges of an object). However, very fast and high capacity memories are required for these devices to operate in real time, and only limited information is obtained about the moving areas or objects observed Other examples of artificial retinas and similar devices are shown in U.S. Pat. Nos. 5,694, 495 and 5,712,729.

Another proposed method for detecting objects in an image is to store a frame from a video camera or other observation sensor in a first two-dimensional memory. The frame is composed of a sequence of pixels representative of the scene observed by the camera at time to. The video signal for the next frame, which represents the scene at time t0 is stored in a second two-dimensional memory. If an object has moved between times to and t0 the distance d by which the object, as represented by its pixels, has moved in the scene between t, and to is determined. The displacement speed is then equal to d/T, where T=t1−t0. This type of system requires a very large memory capacity if it is used to obtain precise speed and oriented direction. Information for the movement of the object. There is also a delay in obtaining the speed and displacement direction information corresponding to t1+R, where R is the time necessary for the calculations for the period t0−t1 system. These two disadvantages limit applications of this type of system.

Another type of prior image processing system is shown in French Patent No. 2,611,063, of which the inventor hereof is also an inventor. This patent relates to a method and apparatus for real time processing of a sequenced data flow from the output of a camera in order to perform data compression. A histogram of signal levels from the camera is formed using a first sequence classification law. A representative Gaussian function associated with the histogram is stored, and the maximum and minimum levels are extracted. The signal levels of the next sequence are compared with the signal levels for the first sequence using a fixed time constant identical for each pixel. A binary classification signal is generated that characterizes the next sequence with reference to the classification law An auxiliary signal is generated from the binary signal that is representative of the duration and position of a range of significant values. Finally, the auxiliary signal is used to generate a signal localizing the range with the longest duration, called the dominant range. These operations are repeated for subsequent sequences of the sequenced signal.

This prior process enables data compression, keeping only interesting parameters in the processed flow of sequenced data. In particular, the process is capable of processing a digital video signal in order to extract and localize at least one characteristic of at least one area in the image. It is thus possible to classify, for example, brightness and/or chrominance levels of the signal and to characterize and localize an object in the image.

Another system is also known from WO 98/05002, of which the inventor hereof is also an inventor. This system enables real time detection, location and determination of the speed and direction of movement of an area of relative movement in a scene. It includes a time processing unit of a spatial processing unit in order to determine said speed and direction of movement.

U.S. Pat. No. 5,488,430 detects and estimates a displacement by separately determining horizontal and vertical changes of the observed area. Difference signals are used to detect movements from right to left or from left to right, or from top to bottom or bottom to top, in the horizontal and vertical directions respectively. This is accomplished by carrying out an EXCLUSIVE OR function on horizontal/vertical difference signals and on frame difference signals, and by using a ratio of the sums of the horizontal/vertical signals and the sums of frame difference signals with respect to a K×3 window. Calculated values of the image along orthogonal horizontal and vertical directions are used with an identical repetitive difference K in the orthogonal directions, this difference K being defined as a function of the displacement speeds that are to be determined. The device determines the direction of movement along each of the two orthogonal directions by applying a set of calculation operations to the difference signals, which requires very complex computations. Additional complex computations are also necessary to obtain the speed and oriented direction of displacement (extraction of a square root to obtain the amplitude of the speed, and calculation of the arctan function to obtain the oriented direction), starting from projections on the horizontal and vertical axes. This device also does not smooth the pixel values using a time constant, especially a time constant that is variable for each pixel, in order to compensate for excessively fast variations in the pixel values.

Finally, Alberto Tomita Sales Representative. and Rokuva Ishii, "Hand Shape Extraction from a Sequence of Digitized Gray-Scale Images," Institute of Electrical and Electronics Engineers, Vol. 3, 1994, pp. 1925-1930, detects movement by subtracting between successive images, and forming histograms based upon the shape of a human hand in order to extract the shape of a human hand in a digitized scene. The histogram analysis is based upon a gray scale inherent to the human hand. It does not include any means of forming histograms in the plane coordinates. The sole purpose of the method is to detect the displacement of a human hand, for example, in order to replace the normal computer mouse by a hand, the movements of which are identified to control a computer.

It would be desirable to have an image processing system which has a relatively simple structure and requires a relatively small memory capacity, and by which information on the movement of objects within an image can be obtained in real-time. It would also be desirable to have a method and apparatus for detecting movements that are not limited to the hand, but to any object (in the widest sense of the term) in a scene, and which does not use histograms based on the gray values of a hand, but rather the histograms of different variables representative of the displacement and histograms of plane coordinates. Such a system would be applicable to many types of applications requiring the detection of moving and non-moving objects.

SUMMARY OF THE INVENTION

The present invention is a process for identifying relative movement of an object in an input signal, the input signal having a succession of frames, each frame having a succession of pixels. For each pixel of the input signal, the input signal is smoothed using a time constant for the pixel in order to generate a smoothed input signal. For each pixel in the smoothed input signal, a binary value corresponding to the existence of a significant variation in the amplitude of the pixel between the current frame and the immediately previous smoothed input frame, and the amplitude of the variation, are determined.

Using the existence of a significant variation for a given pixel, the time constant for the pixel, which is to be used in smoothing subsequent frames of the input signal, is modified. The time constant is preferably in the form $2^P$, and is increased or decreased by incrementing or decrementing p. For each particular pixel of the input signal, two matrices are then formed: a first matrix comprising the binary values of a subset of the pixels of the frame spatially related to the particular pixel; and a second matrix comprising the amplitude of the variation of the subset of the pixels of the frame spatially related to the particular pixel. In the first matrix, it is determined whether the particular pixel and the pixels along an oriented direction relative to the particular pixel have binary values of a particular value representing significant variation, and, for such pixels, it is determined in the second matrix whether the amplitude of the pixels along the oriented direction relative to the particular pixel varies in a known manner indicating movement in the oriented direction of the particular pixel and the pixels along the oriented direction relative to the particular pixel. The amplitude of the variation of the pixels along the oriented direction determines the velocity of movement of the particular pixel and the pixels along the oriented direction relative to the particular pixel.

In each of one or more domains, a histogram of the values distributed in the first and second matrices falling in each such domain is formed. For a particular domain, an area of significant variation is determined from the histogram for that domain. Histograms of the area of significant variation along coordinate axes are then formed. From these histograms, it is determined whether there is an area in movement for the particular domain. The domains are preferably selected from the group consisting of i) luminance, ii) speed (V), iii) oriented direction (D1), iv) time constant (CO), v) hue, vi) saturation, and vii) first axis (x(m)), and viii) second axis (y(m)).

In one embodiment, the first and second matrices are square matrices, with the same odd number of rows and columns, centered on the particular pixel. In this embodiment, the steps of determining in the first matrix whether the particular pixel and the pixels along an oriented direction relative to the particular pixel have binary values of a particular value representing significant variation, and the step of determining in the second matrix whether the amplitude signal varies in a predetermined criteria along an oriented direction relative to the particular pixel, comprise applying nested n×n matrices, where n is odd, centered on the particular pixel to the pixels within each of the first and second matrices. The process then includes the further step of determining the smallest nested matrix in which the amplitude signal varies along an oriented direction around the particular pixel.

In an alternative embodiment, the first and second matrices are hexagonal matrices centered on the particular pixel. In this embodiment, the steps of determining in the first matrix whether the particular pixel and the pixels along an oriented direction relative to the particular pixel have binary values of a particular value representing significant variation, and the step of determining in the second matrix whether the amplitude signal varies in a predetermined criteria along an oriented direction relative to the particular pixel, comprise applying nested hexagonal matrices of varying size centered on the particular pixel to the pixels within each of the first and second matrices. The process then further includes determining the smallest nested matrix in which the amplitude signal varies along an oriented direction around the particular pixel.

In a still further embodiment of the invention, the first and second matrices are inverted L-shaped matrices with a single row and a single column. In this embodiment, the steps of determining in the first matrix whether the particular pixel and the pixels along an oriented direction relative to the particular pixel have binary values of a particular value representing significant variation, and the step of determining in the second matrix whether the amplitude signal varies in a predetermined criteria along an oriented direction relative to the particular pixel, comprise applying nested n×n matrices, where n is odd, to the single line and the single column to determine the smallest matrix in which the amplitude varies on a line with the steepest slope and constant quantification.

If desired, successive decreasing portions of frames of the input signal may be considered using a Mallat time-scale algorithm, and the largest of these portions, which provides displacement, speed and orientation indications compatible with the value of p, is selected.

In a process of smoothing an input signal, for each pixel of the input signal, i) the pixel is smoothed using a time constant (CO) for that pixel, thereby generating a smoothed pixel value (LO), ii) it is determined whether there exists a significant variation between such pixel and the same pixel in a previous frame, and iii) the time constant (CO) for such pixel to be used in smoothing the pixel in subsequent frames of the input signal is modified based upon the existence or non-existence of a significant variation.

The step of determining the existence of a significant variation for a given pixel preferably comprises determining whether the absolute value of the difference (AB) between the given pixel value (PI) and the value of such pixel in a smoothed prior frame (LI) exceeds a threshold (SE). The step of smoothing the input signal preferably comprises, for each pixel, i) modifying the time constant (CO) for pixel such based upon the existence of a significant variation as determined in the prior step, and ii) determining a smoothed value for the pixel (LO) as follows:

$$LO = LI + \frac{PI - LI}{CO}$$

Time constant (CO) is preferably in the form $2^p$, and p is incremented in the event that AB<SE and decremented in the event AB>=SE.

In this process, the system generates an output signal comprising, for each pixel, a binary value (DP) indicating the existence or non-existence of a significant variation, and the value of the time constant (CO). The binary values (DP) and the time constants (CO) are preferably stored in a memory sized to correspond to the frame size.

A process for identifying an area in relative movement in an input signal includes the steps of:

generating a first array indicative of the existence of significant variation in the magnitude of each pixel between a current frame and a prior frame;

generating a second array indicative of the magnitude of significant variation of each pixel between the current frame and a prior frame;

establishing a first moving matrix centered on a pixel under consideration and comprising pixels spatially related to the pixel under consideration, the first moving matrix traversing the first array for consideration of each pixel of the current frame; and determining whether the pixel under consideration and each pixel of the pixels spatially related to the pixel under consideration along an oriented direction relative thereto within the first matrix are a particular value representing the presence of significant variation, and if so, establishing in a second matrix within the first matrix, centered on the pixel under consideration, and determining whether the amplitude of the pixels in the second matrix spatially related to the pixel under consideration along an oriented direction relative thereto are indicative of movement along such oriented direction, the amplitude of the variation along the oriented direction being indicative of the velocity of movement, the size of the second matrix being varied to identify the matrix size most indicative of movement.

The process further comprises, in at least one domain selected from the group consisting of i) luminance, ii) speed (V), iii) oriented direction (DI), iv) time constant (CO), v) hue, vi) saturation, and vii) first axis (x(m)), and viii) second axis (y(m)), and ix) data characterized by external inputs, forming a first histogram of the values in such domain for pixels indicative of movement along an oriented direction relative to the pixel under consideration. If desired, for the pixels in the first histogram, histograms of the position of such pixels along coordinate axes may be formed, and from such histograms, an area of the image meeting criteria of the at least one domain may be determined.

A process for identifying pixels in an input signal in one of a plurality of classes in one of a plurality of domains comprises, on a frame-by-frame basis:

for each pixel of the input signal, analyzing the pixel and providing an output signal for each domain containing information to identify each domain in which the pixel is classified;

providing a classifier for each domain, the classifier enabling classification of pixels within each domain to selected classes within the domain;

providing a validation signal for the domains, the validation signal selecting one or more of the plurality of domains for processing; and forming a histogram for pixels of the output signal within the classes selected by the classifier within each domain selected by the validation signal.

The process further includes the steps of forming histograms along coordinate axes for the pixels within the classes selected by the classifier within each domain selected by the validation signal, and forming a composite signal corresponding to the spatial position of such pixels within the frame. Pixels falling within limits $l_a, l_b, l_c, l_d$ in the histograms along the coordinate axes are then identified, and a composite signal from the pixels falling within these limits is formed.

A process for identifying the velocity of movement of an area of an input signal comprises:

for each particular pixel of the input signal, forming a first matrix comprising binary values indicating the existence or non-existence of a significant variation in the amplitude of the pixel signal between the current frame and a prior frame for a subset of the pixels of the frame spatially related to such particular pixel, and a second matrix comprising the amplitude of such variation;

determining in the first matrix whether the particular pixel and the pixels along an oriented direction relative to the particular pixel have binary values of a particular value representing significant variation, and, for such pixels, determining in the second matrix whether the amplitudes of the pixels along an oriented direction relative to the particular pixel vary in a known manner indicating movement of the pixel and the pixels along an oriented direction relative to the particular pixel, the amplitude of the variation along the oriented direction determining the velocity of movement of the particular pixel.

A process for identifying a non-moving area in an input signal comprises:

forming histograms along coordinate axes for pixels of the input signal without significant variation between the current frame and a prior frame; and forming a composite signal corresponding to the spatial position of such pixels within the frame.

An apparatus for identifying relative movement in an input signal comprises:

means for smoothing the input signal using a time constant for each pixel, thereby generating a smoothed input signal;

means for determining for each pixel in the smoothed input signal a binary value corresponding to the existence of a significant variation in the amplitude of the pixel signal between the current frame and the immediately previous smoothed input frame, and for determining the amplitude of the variation;

means for using the existence of a significant variation for a given pixel to modify the time constant for the pixel to be used in smoothing subsequent frames of the input signal;

means for forming a first matrix comprising the binary values of a subset of the pixels of the frame spatially related to each particular pixel, and for forming a second matrix comprising the amplitude of the variation of the subset of the pixels of the frame spatially related to such particular pixel;

means for determining in the first matrix a particular area in which the binary value for each pixel is a particular value representing significant variation, and, for such particular area, for determining in the second matrix whether the amplitude varies along an oriented direction relative to the particular pixel in a known manner indicating movement of the pixel in the oriented direction, the amplitude of the variation along the oriented direction determining the velocity of movement of the pixel.

An apparatus for smoothing an input signal comprises:

means for smoothing each pixel of the input signal using a time constant (CO) for such pixel, thereby generating a smoothed pixel value (LO);

means for determining the existence of a significant variation for a given pixel, and modifying the time constant (CO) for the pixel to be used in smoothing the pixel in subsequent frames of the input signal based upon the existence of such significant variation.

An apparatus for identifying an area in relative movement in an input signal comprises:

means for generating a first array indicative of the existence of significant variation in the magnitude of each pixel between a current frame and a prior frame;

means for generating a second array indicative of the magnitude of significant variation of each pixel between the current frame and a prior frame;

means for establishing a first moving matrix centered on a pixel under consideration and comprising pixels spatially related to the pixel under consideration, the first moving matrix traversing the first array for consideration of each pixel of the current frame;

means for determining whether the pixel under consideration and each pixel along an oriented direction relative to the pixel under consideration within the first matrix is a particular value representing the presence of significant variation, and if so, for establishing a second matrix within the first matrix, centered on the pixel under consideration, and for determining whether the amplitude of the pixels in the second matrix are indicative of movement along an oriented direction relative to the pixel under consideration, the amplitude of the variation along the oriented direction being indicative of the velocity of movement, the size of the second matrix being varied to identify the matrix size most indicative of movement.

An apparatus for identifying pixels in an input signal in one of a plurality of classes in one of a plurality of domains comprises:

means for analyzing each pixel of the input signal and for providing an output signal for each domain containing information to identify each domain in which the pixel is classified;

a classifier for each domain, the classifier classifying pixels within each domain in selected classes within the domain;

a linear combination unit for each domain, the linear combination unit generating a validation signal for the domain, the validation signal selecting one or more of the plurality of domains for processing; and means for forming a histogram for pixels of the output signal within the classes selected by the classifier within each domain selected by the validation signal.

An apparatus for identifying the velocity of movement of an area of an input signal comprises:

means for determining for each pixel in the input signal a binary value corresponding to the existence of a significant variation in the amplitude of the pixel signal between the current frame and the immediately previous smoothed input frame, and for determining the amplitude of the variation, means for forming, for each particular pixel of the input signal, a first matrix comprising the binary values of a subset of the pixels spatially related to such particular pixel, and a second matrix comprising the amplitude of the variation of the subset of the pixels spatially related to such particular pixel; and means for determining in the first matrix whether for a particular pixel, and other pixels along an oriented direction relative to the particular pixel, the binary value for each pixel is a particular value representing significant variation, and, for such particular pixel and other pixels, determining in the second matrix whether the amplitude varies along an oriented direction relative to the particular pixel in a known manner indicating movement of the pixel and the other pixels, the amplitude of the variation along the oriented direction determining the velocity of movement of the pixel and the other pixels.

An apparatus for identifying a non-moving area in an input signal comprises:

means for forming histograms along coordinate axes for pixels of a current frame without a significant variation from such pixels in a prior frame; and means for forming a composite signal corresponding to the spatial position of such pixels within the frame.

BRIEF DESCRIPTION OF THE DRAWINGS

FIG. 9 illustrates reverse-L matrices as processed by the temporal processing unit.

FIG. 9a illustrates angular sector shaped matrices as processed by the temporal processing unit.

FIG. 10 is a block diagram showing the relationship between the temporal and spatial processing units, and the histogram formation units.

DETAILED DESCRIPTION OF THE INVENTION

The present invention is a method and apparatus for detection of relative movement or non-movement of an area within an image. Relative movement, as used herein, means movement of an area, which may be an "object" in the broadest sense of the term, e.g., a person, a portion of a person, or any animals or inanimate object, in an approximately motionless environment, or approximate immobility of an area in an environment that is at least partially in movement.

Figure 1:
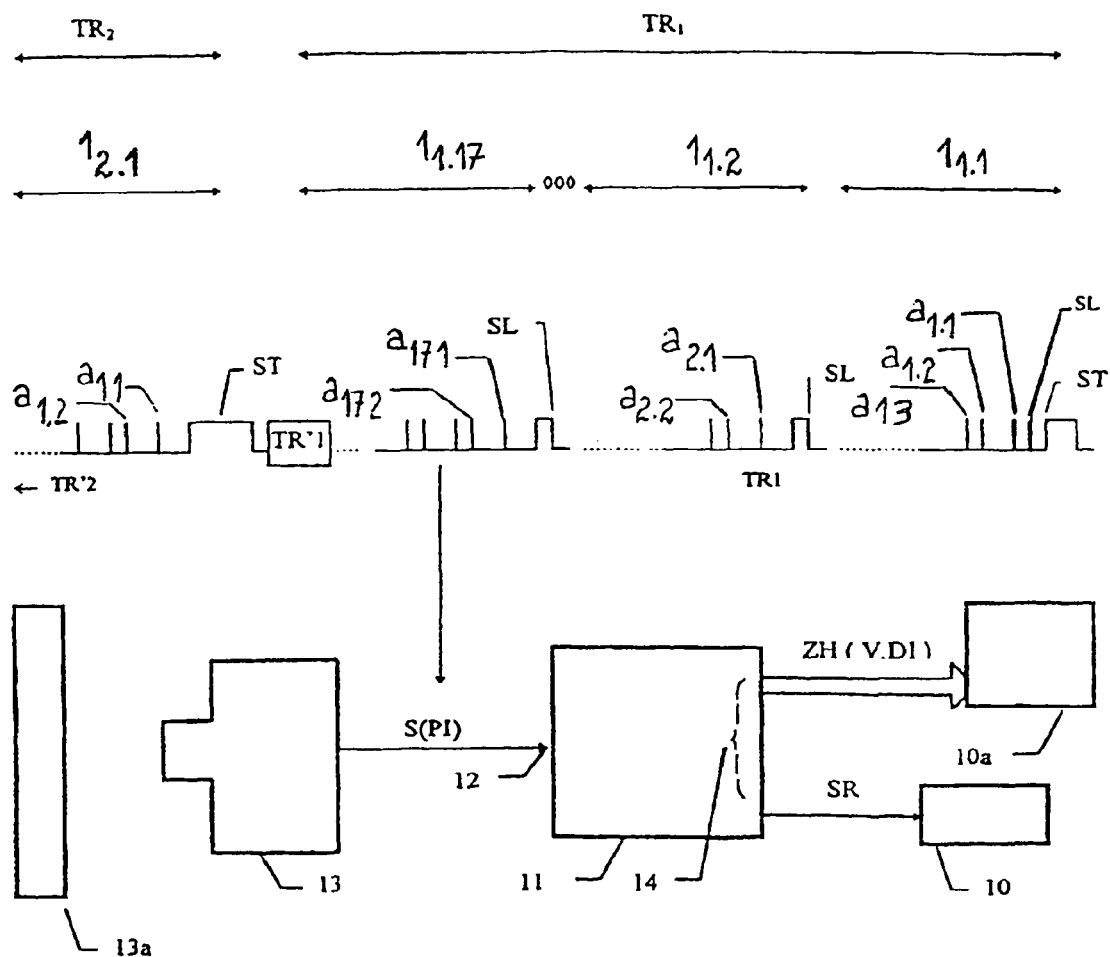
FIG. 1 is a diagrammatic illustration of the system according to the invention.

Referring to FIG. 1, image processing system 11 includes an input 12 that receives a digital video signal S originating from a video camera or other imaging device 13 which monitors a scene 13a. Imaging device 13 is preferably a conventional CMOS type CCD camera. It is, however, foreseen that the system of the invention may be used with any appropriate sensor e.g., ultrasound, IR, Radar, tactile array, etc., that generates an output in the form of an array of information corresponding to information observed by the imaging device. Imaging device 13 may have a direct digital output, or an analog output that is converted by an A/D converter into digital signal S.

While signal S may be a progressive signal, in a preferred embodiment, in which imaging device 13 is a conventional video camera, signal S is composed of a succession of pairs of interlaced frames, $TR_1$ and $TR'_1$ and $TR_2$ and $TR'_2$, each consisting of a succession of horizontal scanned lines, e.g. $l_{1.1}, l_{1.2}, \ldots l_{1.17}$ in $TR_1$ and $l_{2.1}$ in $TR_2$. Each line consists of a succession of pixels or image-points PI, e.g., a1.1, a1.2 and a1.3, for line l1.1; al17.1 and al7.22 for line l1.17; al1.1 and a1.2 for line l2.1. Signal S(PI) represents signal S composed of pixels PI.

As known in the art, S(PI) includes a frame synchronization signal (ST) at the beginning of each frame, a line synchronization signal (SL) at the beginning of each line, and a blanking signal (BL). Thus, S(PI) includes a succession frames, which are representative of the time domain, and within each frame, a series of lines and pixels, which are representative of the spatial domain.

In the time domain, "successive frames" shall refer to successive frames of the same type (i.e., odd frames such as TR1, or even frames such as TR'1), and "successive pixels in the same position" shall denote successive values of the pixels (PI) in the same location in successive frames of the same type, e.g., a1.1 of l1.1 in frame TR1 and a1.1 of l1.1 in the next corresponding frame TR2.

Image processing system 11 generates outputs ZH and SR 14, which are preferably digital signals. Complex signal ZH comprises a number of output signals generated by the system, preferably including signals indicating the existence and localization of an area or object in motion, and the speed V and the oriented direction of displacement DI of pixels of the image. Also output from the system, if desired, is input digital video signal S, which is delayed (SR) to make it synchronous with the output ZH for the frame, taking into account the calculation time for the data in composite signal ZH (one frame). The delayed signal SR is used to display the image received by camera 13 on a monitor or television screen 10, which may also be used to display the information contained in composite signal ZH. Composite signal ZH may also be transmitted to a separate processing assembly 10a in which further processing of the signal may be accomplished.

Figure 2:
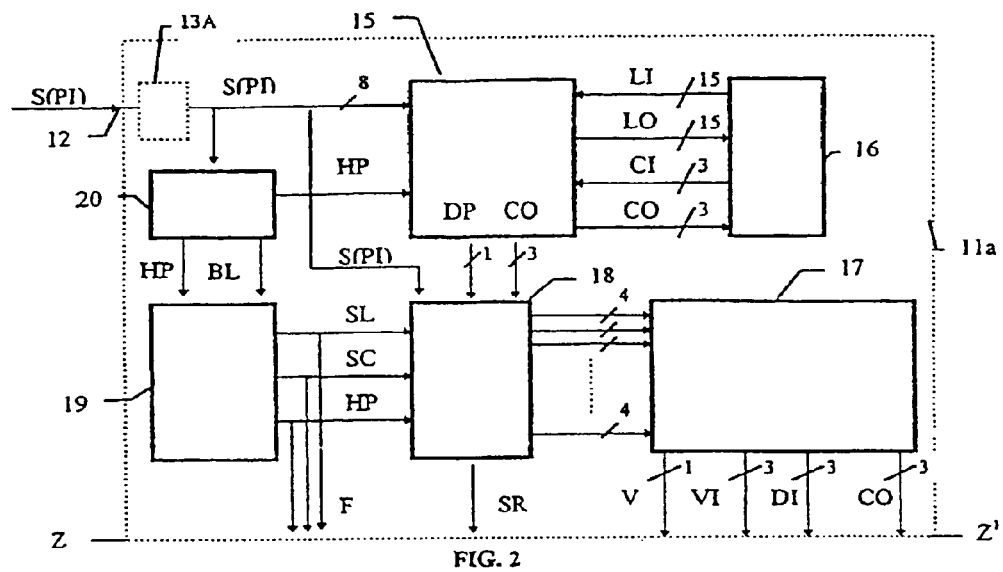
FIG. 2 is a block diagram of the temporal and spatial processing units of the invention.

Referring to FIG. 2, image processing system 11 includes a first assembly 11a, which consists of a temporal processing unit 15 having an associated memory 16, a spatial processing unit 17 having a delay unit 18 and sequencing unit 19, and a pixel clock 20, which generates a clock signal HP, and which serves as a clock for temporal processing unit 15 and sequencing unit 19. Clock pulses HP are generated by clock 20 at the pixel rate of the image, which is preferably 13.5 MHZ.

Figure 3:
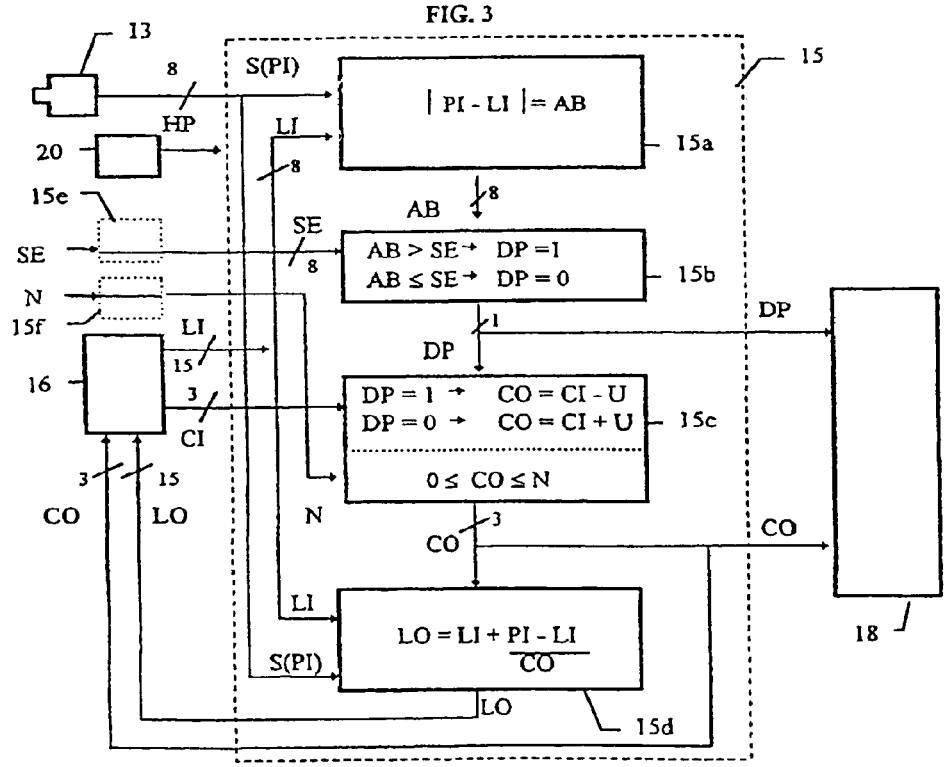
FIG. 3 is a block diagram of the temporal processing unit of the invention.

FIG. 3 shows the operation of temporal processing unit 15, the function of which is to smooth the video signal and generate a number of outputs that are utilized by spatial processing unit 17. During processing, temporal processing unit 15 retrieves from memory 16 the smoothed pixel values LI of the digital video signal from the immediately prior frame, and the values of a smoothing time constant CI for each pixel. As used herein, LO and CO shall be used to denote the pixel values (L) and time constants (C) stored in memory 16 from temporal processing unit 15, and LI and CI shall denote the pixel values (L) and time constants (C) respectively for such values retrieved from memory 16 for use by temporal processing unit 15. Temporal processing unit 15 generates a binary output signal DP for each pixel, which identifies whether the pixel has undergone significant variation, and a digital signal CO, which represents the updated calculated value of time constant C.

Referring to FIG. 3, temporal processing unit 15 includes a first block 15a which receives the pixels PI of input video signal S. For each pixel PI, the temporal processing unit retrieves from memory 16 a smoothed value LI of this pixel from the immediately preceding corresponding frame, which was calculated by temporal processing unit 15 during processing of the immediately prior frame and stored in memory 16 as LO. Temporal processing unit 15 calculates the absolute value AB of the difference between each pixel value PI and LI for the same pixel position (for example $a_{1.1}$ of $l_{1.1}$ in $TR_1$ and of $l_{1.1}$ in $TR_2$:

$$AB = |PI - LI|$$

Temporal processing unit 15 is controlled by clock signal HP from clock 20 in order to maintain synchronization with the incoming pixel stream. Test block 15b of temporal processing unit 15 receives signal AB and a threshold value SE. Threshold SE may be constant, but preferably varies based upon the pixel value PI, and more preferably varies with the pixel value so as to form a gamma correction. Known means of varying SE to form a gamma correction is represented by the optional block 15e shown in dashed lines. Test block 15b compares, on a pixel-by-pixel basis, digital signals AB and SE in order to determine a binary signal DP. If AB exceeds threshold SE, which indicates that pixel value PI has undergone significant variation as compared to the smoothed value LI of the same pixel in the prior frame, DP is set to "1" for the pixel under consideration. Otherwise, DP is set to "0" for such pixel.

When DP=1, the difference between the pixel value PI and smoothed value LI of the same pixel in the prior frame is considered too great, and temporal processing unit 15 attempts to reduce this difference in subsequent frames by reducing the smoothing time constant C for that pixel. Conversely, if DP=0, temporal processing unit 15 attempts to increase this difference in subsequent frames by increasing the smoothing time constant C for that pixel. These adjustments to time constant C as a function of the value of DP are made by block 15c. If DP=1, block 15c reduces the time constant by a unit value U so that the new value of the time constant CO equals the old value of the constant CI minus unit value U.

$$CO=CI-U$$

If DP=0, block 15c increases the time constant by a unit value U so that the new value of the time constant CO equals the old value of the constant CI plus unit value U.

$$CO=CI+U$$

Thus, for each pixel, block 15c receives the binary signal DP from test unit 15b and time constant CI from memory 16, adjusts CI up or clown by unit value U, and generates a new time constant CO which is stored in memory 16 to replace time constant CI.

In a preferred embodiment, time constant C, is in the form $2^P$, where p is incremented or decremented by unit value U, which preferably equals 1, in block 15c. Thus, if DP=1, block 15c subtracts one (for the case where U=1) from p in the time constant $2^P$ which becomes $2^{P-1}$. If DP=0, block 15c adds one to p in time constant $2^P$, which becomes $2^{P+1}$. The choice of a time constant of the form $2^P$ facilitates calculations and thus simplifies the structure of block 15c.

Block 15c includes several tests to ensure proper operation of the system. First, CO must remain within defined limits. In a preferred embodiment, CO must not become negative (CO>=0) and it must not exceed a limit N(CO<=N), which is preferably seven. In the instance in which CI and CO are in the form $2^P$, the upper limit N is the maximum value for p.

The upper limit N may either be constant or variable. If N is variable, an optional input unit 15f includes a register or memory that enables the user, or another controller to vary N. The consequence of increasing N is to increase the sensitivity of the system to detecting displacement of pixels, whereas reducing N improves detection of high speeds. N may be made to depend on PI (N may vary on a pixel-by-pixel basis, if desired) in order to regulate the variation of LO as a function of the lever of PI, i.e., $N_{ijt}=f(P_{ijt})$, the calculation of which is done in block 15f, which in this case would receive the value of PI from video camera 13.

Finally, a calculation block 15d receives, for each pixel, the new time constant CO generated in block 15c, the pixel values PI of the incoming video signal S, and the smoothed pixel value LI of the pixel in the previous frame from memory 16. Calculation block 15d then calculates a new smoothed pixel value LO for the pixel as follows:

$$LO=LI+(PI-LI)/CO$$

If $CO=2^p$, then $$LO=LI+(PI-LI)/2^{po}$$

where "po", is the new value of p calculated in unit 15c and which replaces previous value of "pi" in memory 16.

The purpose of the smoothing operation is to normalize variations in the value of each pixel PI of the incoming video signal for reducing the variation differences. For each pixel of the frame, temporal processing unit 15 retrieves LI and CI from memory 16, and generates new values LO (new smoothed pixel value) and CO (new time constant) that are stored in memory 16 to replace LI and CI respectively. As shown in FIG. 2, temporal processing unit 15 transmits the CO and DP values for each pixel to spatial processing unit 17 through the delay unit 18.

The capacity of memory 16 assuming that there are R pixels in a frame, and therefore 2R pixels per complete image, must be at least 2R(e+f) bits, where e is the number of bits required to store a single pixel value LI (preferably eight bits), and f is the number of bits required to store a single time constant CI (preferably 3 bits). If each video image is composed of a single frame (progressive image), it is sufficient to use R(e+f) bits rather than 2R(e+f) bits.

Spatial processing unit 17 is used to identify an area in relative movement in the images from camera 13 and to determine the speed and oriented direction of the movement. Spatial processing unit 17, in conjunction with delay unit 18, cooperates with a control unit 19 that is controlled by clock 20, which generates clock pulse HP at the pixel frequency. Spatial processing unit 17 receives signals $DP_{ij}$ and $CO_{ij}$ (where i and j correspond to the x and y coordinates of the pixel) from temporal processing unit 15 and processes these signals as discussed below. Whereas temporal processing unit 15 processes pixels within each frame, spatial processing unit 17 processes groupings of pixels within the frames.

Figure 5:
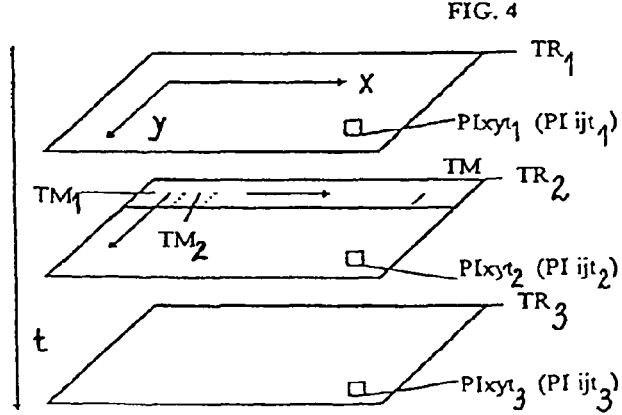
FIG. 5 is a diagram showing the processing of pixels in accordance with the invention.

FIG. 5 diagrammatically shows the temporal processing of successive corresponding frame sequences $TR_1$ $TR_2$, $TR_3$ and the spatial processing in the these frames of a pixel PI with coordinates x, y, at times $t_1$ $t_2$, and $t_3$. A plane in FIG. 5 corresponds to the spatial processing of a frame, whereas the superposition of frames corresponds to the temporal processing of successive frames.

Figure 4:
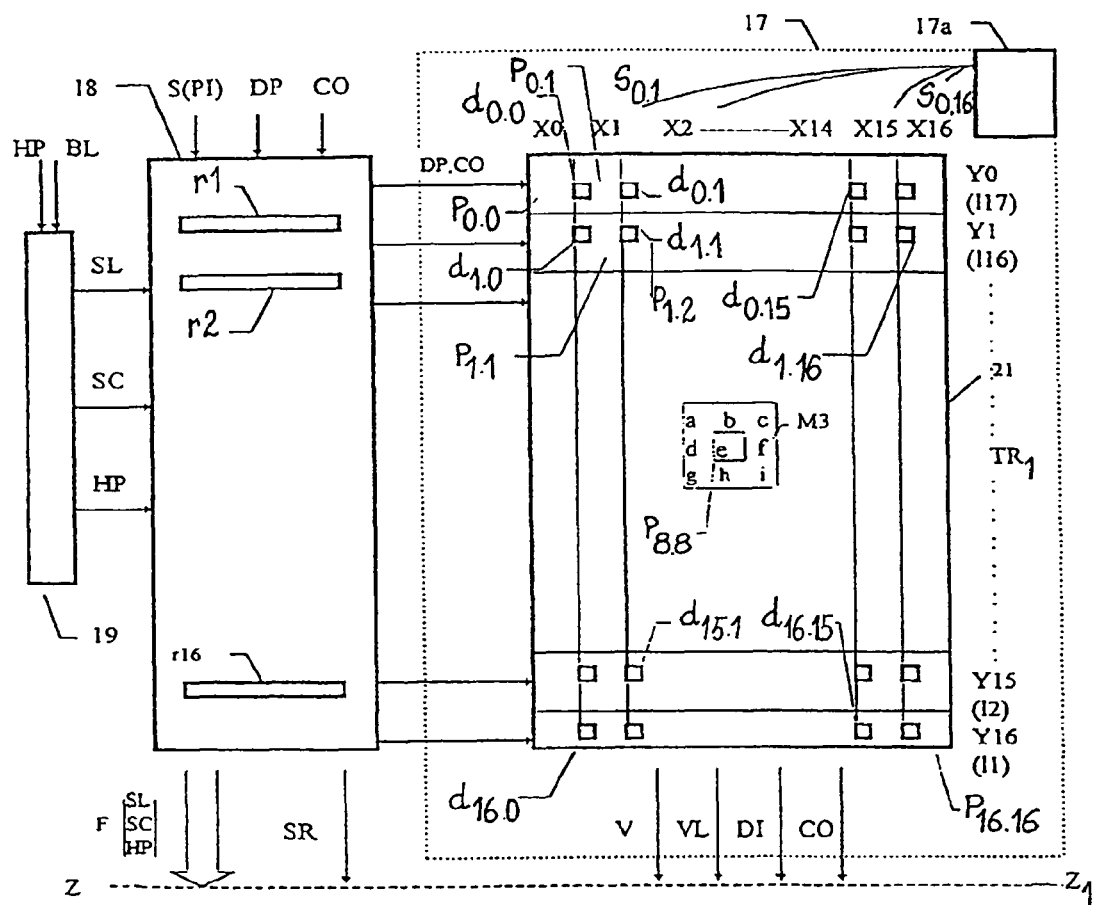
FIG. 4 is a block diagram of the spatial processing unit of the invention.

Signals $DP_{ij}$ and $CO_{ij}$ from temporal processing unit 15 are distributed by spatial processing unit 17 into a first matrix 21 containing a number of rows and columns much smaller than the number of lines L of the frame and the number of pixels M per line. Matrix 21 preferably includes 2l+1 lines along the y axis and 2m+1 columns along the x axis (in Cartesian coordinates), where l and m are small integer numbers. Advantageously, l and m are chosen to be powers of 2, where for example l is equal to $2^a$ and m is equal to $2^b$, a and b being integer numbers of about 2 to 5, for example. To simplify the drawing and the explanation, m will be taken to be equal to l (although it may be different) and m=l=$2^3$=8. In this case, matrix 21 will have 2×8+1=17 rows and 17 columns. FIG. 4 shows a portion of the 17 rows $Y_0$, $Y_1$, ... $Y_{15}$, $Y_{16}$ and 17 columns $X_0$, $X_1$, ... $X_{15}$, $X_{16}$ which form matrix 21.

Spatial processing unit 17 distributes into 1×m matrix 21 the incoming flows of $DP_{ijt}$ and $CO_{ijt}$ from temporal processing unit 15. It will be appreciated that only a subset of all $DP_{ijt}$ and $CO_{ijt}$ values will be included in matrix 21, since the frame is much larger, having L lines and M pixels per row (e.g., 312.5 lines and 250-800 pixels), depending upon the TV standard used.

In order to distinguish the L×M matrix of the incoming video signal from the l×m matrix 21 of spatial processing unit 17, the indices i and j will be used to represent the coordinates of the former matrix (which will only be seen when the digital video signal is displayed on a television screen or monitor) and the indices x and y will be used to represent the coordinates of the latter. At a given instant, a pixel with an instantaneous value $PI_{ijt}$ is characterized at the input of the spatial processing unit 17 by signals $DP_{ijt}$ and $CO_{ijt}$. The (2l+1)×(2m+1) matrix 21 is formed by scanning each of the L×M matrices for DP and CO.

In matrix 21, each pixel is defined by a row number between 0 and 16 (inclusive), for rows $Y_0$ to $Y_{16}$ respectively, and a column number between 0 and 16 (inclusive), for columns $X_0$ to $X_{16}$ respectively, in the case in which l=m=8. In this case, matrix 21 will be a plane of 17×17=289 pixels.

In FIG. 4, elongated horizontal rectangles $Y_0$ to $Y_{16}$ (only four of which have been shown, i.e., $Y_0$, $Y_1$, $Y_{15}$ and $Y_{16}$) and vertical lines $X_0$ to $X_{16}$ (of which only four have been shown, i.e., $X_0$, $X_1$, $X_{15}$ and $X_{16}$) illustrate matrix 21 with 17×17 image points or pixels having indices defined at the intersection of an ordinate row and an abscissa column. For example, the $P_{88}$ is at the intersection of column 8 and row 8 as illustrated in FIG. 4 at position e, which is the center of matrix 21.

In response to the HP and BL signals from clock 20 (FIG. 2), a rate control or sequencing unit 19: i) generates a line sequence signal SL at a frequency equal to the quotient of 13.5 MHZ (for an image with a corresponding number of pixels) divided by the number of columns per frame (for example 400) to delay unit 18, ii) generates a frame signal SC, the frequency of which is equal to the quotient 13.5/400 MHZ divided by the number of rows in the video image, for example 312. 5, iii) and outputs the HP clock signal. Blanking signal BL is used to render sequencing unit 19 non-operational during synchronization signals in the input image.

A delay unit 18 carries out the distribution of portions of the L×M matrix into matrix 21. Delay unit 18 receives the DP, CO, and incoming pixel S(PI) signals, and distributes these into matrix 21 using clock signal HP and line sequence and column sequence signals SL and SC.

In order to form matrix 21 from the incoming stream of DP and CO signals, the successive rows $Y_0$ to $Y_{16}$ for the DP and CO signals must be delayed as follows:

row $Y_0$—not delayed;
row $Y_1$—delayed by the duration of a frame line TP;
row $Y_2$—delayed by 2 TP;
and so on until
row $Y_{16}$—delayed by 16 TP.

The successive delays of the duration of a frame row TP, are carried out in a cascade of sixteen delay circuits $r_1, r_2, \ldots r_{16}$ that serve rows $Y_1, Y_2 \ldots Y_{16}$, respectively, row Y0 being served directly by the DP and CO signals without any delay upon arriving from temporal processing unit 15. All delay circuits $r_1, r_2, \ldots r_{16}$ may be built up by a delay line with sixteen outputs, the delay imposed by any section thereof between two successive outputs being constant and equal to TP.

Rate control unit 19 controls the scanning of the entire L×M frame matrix over matrix 21. The circular displacement of pixels in a row of the frame matrix on the 17×17 matrix, for example from $X_0$ to $X_{16}$ on row Y0, is done by a cascade of sixteen shift registers d on each of the 17 rows from $Y_0$ to $Y_{16}$ (giving a total of 16×17=272 shift registers) placed in each row between two successive pixel positions, namely the register $d_{01}$ between positions $PI_{00}$ and $PI_{01}$ register $d_{02}$ between positions $PI_{01}$ and $PI_{02}$, etc. Each register imposes a delay TS equal to the time difference between two successive pixels in a row or line, using column sequence signal SC. Because rows $l_1, l_2 \ldots l_{17}$ in a frame TR1 (FIG. 1), for S(PI) and for DP and CO, reach delay unit 18 shifted by TP (complete duration of a row) one after the other, and delay unit 18 distributes them with gradually increasing delays of TP onto rows $Y_0, Y_1 \ldots Y_{17}$, these rows display the DP and CO signals at a given time for rows $l_1, l_2 \ldots l_{17}$ in the same frame portion. Similarly in a given row, e.g., $l_1$, successive pixel signals $a_{1.1}, a_{1.2} \ldots$ arrive shifted by TS and shift registers d impose a delay also equal to TS. As a result, the pixels of the DP and CO signals in a given row $Y_0$ to $Y_{16}$ in matrix 21, are contemporary, i.e., they correspond to the same frame portion.

The signals representing the COs and DPs in matrix 21 are available at a given instant on the 16×17=272 outputs of the shift registers, as well as upstream of the registers ahead of the 17 rows, i.e. registers $d_{0\,1}, d_{1\,1} \ldots d_{16\,1}$ which makes a total of 16×17+17=17×17 outputs for the 17×17 positions $P_{0\,0}$, $P_{0\,1} \ldots P_{8.8} \ldots P_{16.16.}$ In order to better understand the process of spatial processing, the system will be described with respect to a small matrix M3 containing 3 rows and 3 columns where the central element of the 9 elements thereof is pixel e with coordinates x=8, y=8 as illustrated below:

a b c
d e f (M3)
g h i

Figure 6:
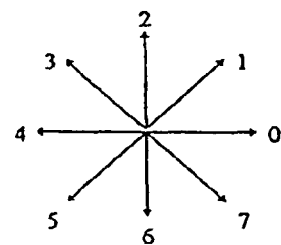
FIG. 6 illustrates the numerical values of the Freeman code used to determine movement direction in accordance with the invention.

In matrix M3, positions a, b, c, d, f, g, h, i around the central pixel e correspond to eight oriented directions relative to the central pixel The eight directions may be identified using the Freeman code illustrated in FIG. 6, the directions being coded 0 to 7 starting from the x axis, in steps of 45°. In the Freeman code, the eight possible oriented directions, may be represented by a 3-bit number since $2^3=8$.

Considering matrix M3 the 8 directions of the Freeman code are as follows:

3 2 1
4 e0
5 6 7

Returning to matrix 21 having 17×17 pixels, a calculation unit 17a examines at the same time various nested square second matrices centered on e, with dimensions 15×15, 13×13, 11×11, 9×9, 7×7, 5×5 and 3×3, within matrix 21, the 3×3 matrix being the M3 matrix mentioned above. Spatial processing unit 17 determines which matrix is the smallest in which pixels with DP=1 are aligned along a straight line which determines the direction of movement of the aligned pixels.

Figure 7:
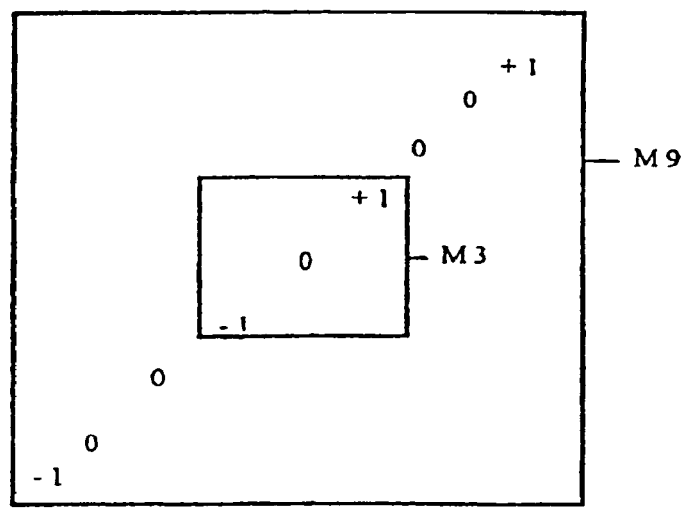
FIG. 7 illustrates two nested matrices as processed by the temporal processing unit.

For the aligned pixels in the matrix, the system determines if CO varies on each side of the central position in the direction of alignment, from +a in an oriented direction and −a in the opposite oriented direction, where I<a<N. For example, if positions g, e, and c of M3 have values −1, 0, +1, then a displacement exists in this matrix from right to left in the (oriented) direction 1 in the Freeman code (FIG. 6). However, positions g, e, and c must at the same time have DP=1. The displacement speed of the pixels in motion is greater when the matrix, among the 3×3 to 15×15 nested matrices, in which CO varies from +1 or −1 between two adjacent positions along a direction is larger. For example, if positions g, e, and c in the 9×9 matrix denoted M9 have values −1,0, +1 in oriented direction 1, the displacement will be faster than for values −1,0, +1 in 3×3 matrix M3 (FIG. 7). The smallest matrix for which a line meets the test of DP=1 for the pixels in the line and CO varies on each side of the central position in the direction of alignment, from +a in an oriented direction and −a in the opposite oriented direction, is chosen as the principal line of interest.

In a further step in the smallest matrix 3×3, the validity of the calculation with a variation of plus or minus two units (Co) with DP=1 determines a subpixel movement i.e. one half of pixel per image.

In the same way if the variation is of plus or minus 3, the movement is still slower i.e. one third of pixel per image.

One improvement for reducing the power of calculation is to test only the values which are symmetrical relative to the central value. The test DP=1 and CO=±1 or CO=±2 and ±3 in the smallest matrix allows to simplify the hardware.

Since CO is represented as a power of 2 in a preferred embodiment, an extended range of speeds may be identified using only a few bits for CO, while still enabling identification of relatively low speeds. Varying speed may be detected because, for example −2,0, +2 in positions g, e, c in 3×3 matrix M3 indicates a speed half as fast as the speed corresponding to 1, 0, +1 for the same positions in matrix M3.

Two tests are preferably performed on the results to remove uncertainties. The first test chooses the strongest variation, in other words the highest time constant, if there are variations of CO along several directions in one of the nested matrices. The second test arbitrarily chooses one of two (or more) directions along which the variation of CO is identical, for example by choosing the smallest value of the Freeman code, in the instance when identical lines of motion are directed in a single matrix in different directions This usually arises when the actual direction of displacement is approximately between two successive coded directions in the Freeman code, for example between directions 1 and 2 corresponding to an (oriented) direction that can be denoted 1.5 (FIG. 6) of about 67.5° with the x axis direction (direction 0 in the Freeman code).

The scanning of an entire frame of the digital video signal S preferably occurs in the following sequence. The first group of pixels considered is the first 17 rows or lines of the frame, and the first 17 columns of the frame. Subsequently, still for the first 17 rows of the frame, the matrix is moved column by column from the left of the frame to the right, as shown in FIG. 5, i.e. from portion TM, at the extreme left, then $TM_2$ offset by one column with respect to $TM_1$ until $TM_M$ (where M is the number of pixels per frame line or row) at the extreme right. Once the first 17 rows have been considered for each column from left to right, the process is repeated for rows 2 to 18 in the frame. This process continues, shifting down one row at a time until the last group of lines at the bottom of the frame, i.e., lines L-16 . . . L (where L is the number of lines per frame) are considered.

Spatial processing unit 17 generates the following output signals for each pixel: i) a signal V representing the displacement speed for the pixel, based upon the amplitude of the maximum variation of CO surrounding the pixel, the value of which may be, for example, represented by an integer in the range 0-7 if the speed is in the form of a power of 2, and therefore may be stored in 3 bits, ii) a signal DI representing the direction of displacement of the pixel, which is calculated from the direction of maximum variation, the value of DI being also preferably represented by an integer in the range 0-7 corresponding to the Freeman code, stored in 3 bits, iii) a binary validation signal VL which indicates whether the result of the speed and oriented direction is valid, in order to be able to distinguish a valid output with V=0 and DI=0, from the lack of an output due to an incident, this signal being 1 for a valid output or 0 for an invalid output, iv) a time constant signal CO, stored in 3 bits, for example, and v) a delayed video signal SR consisting of the input video signal S delayed in the delay unit 18 by 16 consecutive line durations TR and therefore by the duration of the distribution of the signal S in the 17×17 matrix 21, in order to obtain a video signal timed to matrix 21, which may be displayed on a television set or monitor. Also output are the clock signal HP, line sequence signal SL and column sequence signal SC from control unit 19.

An improvement in the calculation of the motion where several directions are responsive at the same time consists in testing by group of 3 contiguous directions the validity of the operations and to select only the central value.

Figure 8:
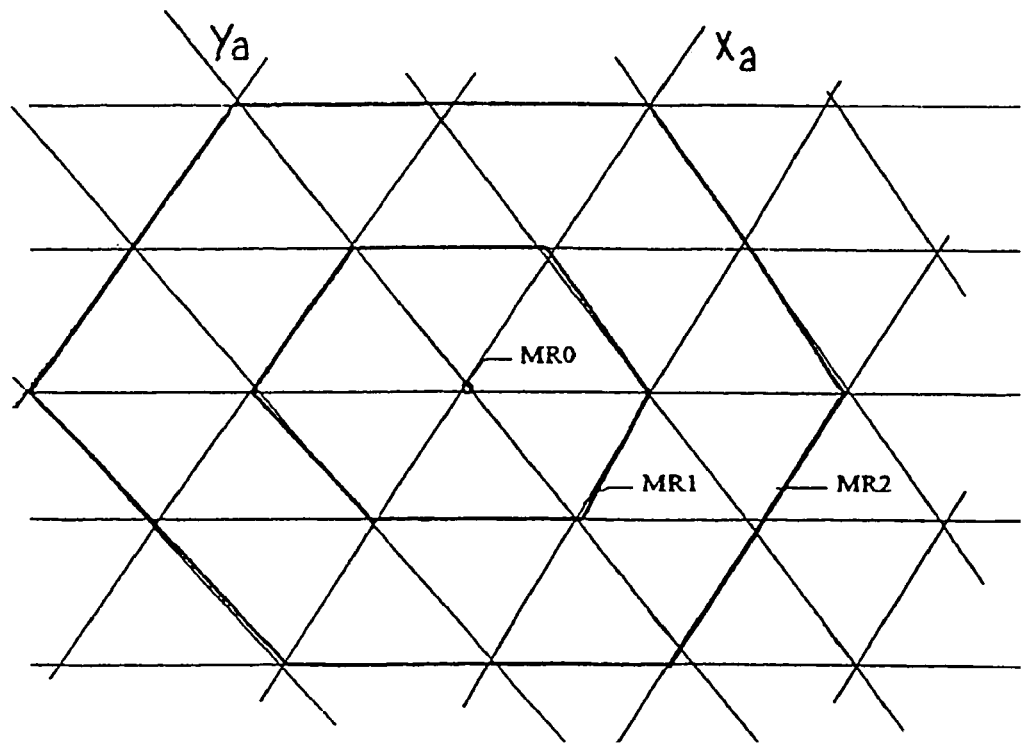
FIG. 8 illustrates hexagonal matrices as processed by the temporal processing unit.

Nested hexagonal matrices (FIG. 8) or an inverted L-shaped matrix (FIG. 9) may be substituted for the nested rectangular matrices in FIGS. 4 and 7. In the case shown in FIG. 8, the nested matrices (in which only the most central matrices MR1 and MR2 have been shown) are all centered on point MR0 which corresponds to the central point of matrices M3, M9 in FIG. 7. The advantage of a hexagonal matrix system is that it allows the use of oblique coordinate axes $x_a$, $y_a$, and a breakdown into triangles with identical sides, to carry out an isotropic speed calculation.

The matrix in FIG. 9 is composed of a single row ($L_u$) and a single column ($C_u$) starting from the central position $MR_U$ in which the two signals DP and CO respectively are equal to "1" for DP and increase or decrease by one unit for CO, if movement occurs.

If movement is in the direction of the x coordinate, the CO signal is identical in all positions (boxes) in column $C_u$, and the binary signal DP is equal to 1 in all positions in row $L_u$, from the origin $MR_U$, with the value $CO_u$, up to the position in which CO is equal to $CO_u$ +1 or −1 inclusive. If movement is in the direction of the y coordinate, the CO signal is identical in all positions (boxes) in row $L_u$, and the binary signal DP is equal to 1 in all positions in column $C_u$, from the origin $MR_U$, with the value $CO_u$, up to the position in which CO is equal to $CO_u$ +1 or −1 inclusive. If movement is oblique relative to the x and y coordinates, the binary signal DP is equal to 1 and CO is equal to $CO_u$ in positions (boxes) of $L_u$ and in positions (boxes) of $C_u$, the slope being determined by the perpendicular to the line passing through the two positions in which the signal $CO_u$, changes by the value of one unit, the DP signal always being equal to 1.

FIG. 9 shows the case in which DP=1 and $CO_u$ changes value by one unit in the two specific positions $L_{u3}$ and $C_{u5}$ and indicates the corresponding slope $P_p$. In all cases, the displacement speed is a function of the position in which CO changes value by one unit. If CO changes by one unit in $L_u$ or $C_u$ only, it corresponds to the value of the CO variation position. If CO changes by one unit in a position in $L_u$ and in a position in $C_u$, the speed is proportional to the distance between $MR_u$ and $E_x$ (intersection of the line perpendicular to $C_u$-$L_u$ passing through $MR_u$).

FIG. 9a shows an imaging device with sensors located at the crossings of concentric lines c and radial lines d, said lines corresponding to the rows and columns of a rectangular matrix imaging device.

An angular sector shaped odd matrix n×n Mc is associated to said imaging device.

The operation of such imaging arrangement is controlled by a circular scanning sequencer.

Except the sequencing differences, the operation of this arrangement is identical to that of the square matrix arrangement.

As shown in FIGS. 10-14, image processing system 11 is used in connection with a histogram processor 22a for identifying objects within the input signal based upon user specified criteria for identifying such objects. A bus Z-$Z_1$ (See FIGS. 2, 10 and 11) transfers the output signals of image processing system 11 to histogram processor 22a. Histogram processor 22a generates composite output signal ZH which contains information on the areas in relative movement in the scene.

Figure 11:
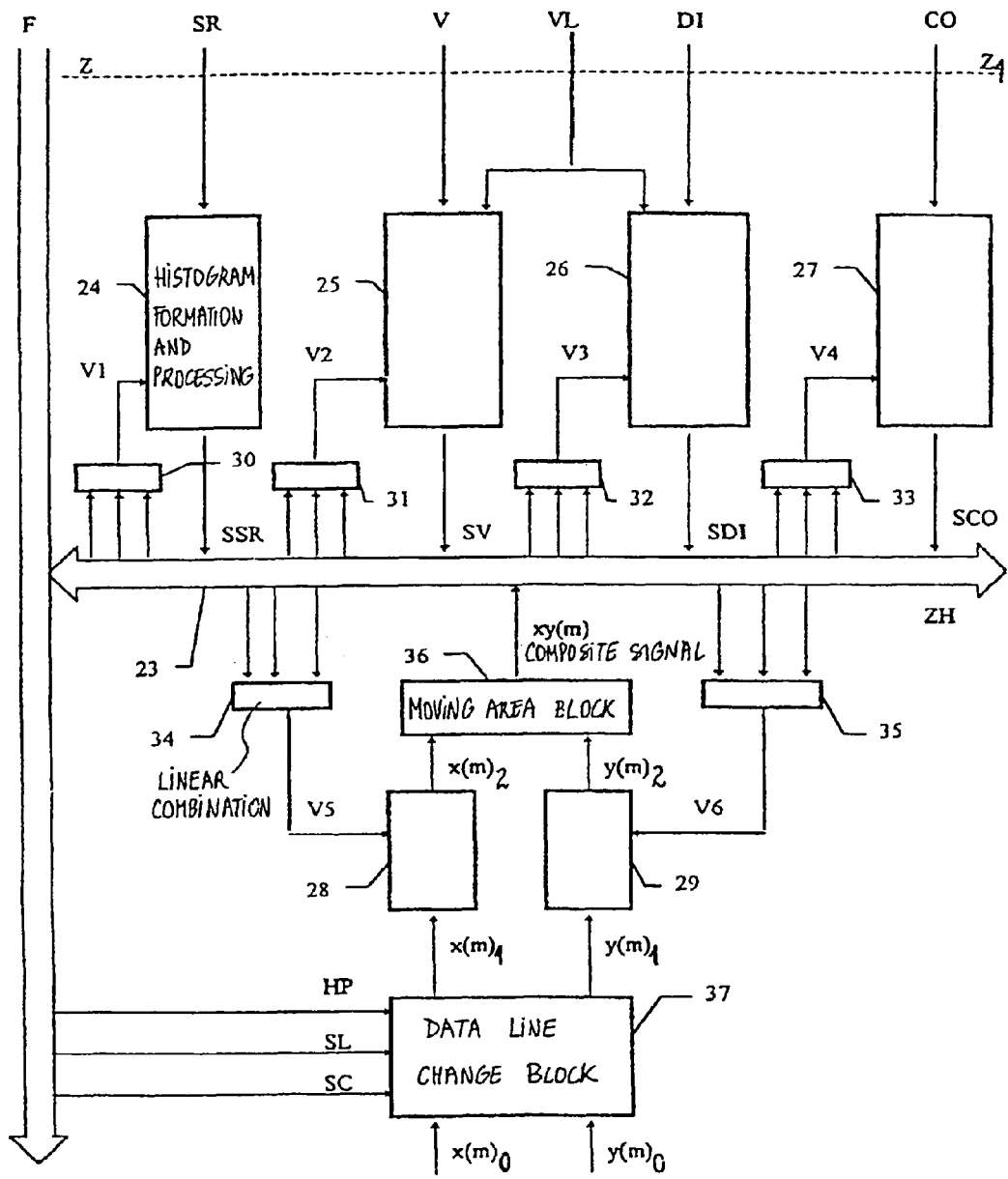
FIG. 11 is a block diagram showing the interrelationship between the various histogram formation units.

Referring to FIG. 11, histogram processor 22a includes a bus 23 for communicating signals between the various components thereof. Histogram formation and processing blocks 24-29 receive the various input signals, i.e., delayed digital video signal SR, speed V, oriented directions (in Freeman code) DI, time constant CO, first axis x(m) and second axis y(m), which are discussed in detail below. The function of each histogram formation block is to enable a histogram to be formed for the domain associated with that block. For example, histogram formation block 24 receives the delayed digital video signal SR and enables a histogram to be formed for the luminance values of the video signal. Since the luminance of the signal will generally be represented by a number in the range of 0-255, histogram formation block 24 is preferably a memory addressable with 8 bits, with each memory location having a sufficient number of bits to correspond to the number of pixels in a frame.

Histogram formation block 25 receives speed signal V and enables a histogram to be formed for the various speeds present in a frame. In a preferred embodiment, the speed is an integer in the range 0-7. Histogram formation block 25 is then preferably a memory addressable with 3 bits, with each memory location having a sufficient number of bits to correspond to the number of pixels in a frame.

Histogram formation block 26 receives oriented direction signal D1 and enables a histogram to be formed for the oriented directions present in a frame. In a preferred embodiment the oriented direction is an integer in the range 0-7, corresponding to the Freeman code. Histogram formation block 26 is then preferably a memory addressable with 3 bits, with each memory location having a sufficient number of bits to correspond to the number of pixels in a frame.

Histogram formation block 27 receives time constant signal CO and enables a histogram to be formed for the time constants of the pixels in a frame In a preferred embodiment, the time constant is an integer in the range 0-7. Histogram formation block 27 is then preferably a memory addressable with 3 bits, with each memory location having a sufficient number of bits to correspond to the number of pixels in a frame.

Histogram formation blocks 28 and 29 receive the x and y positions respectively of pixels for which a histogram is to be formed, and form histograms for such pixels, as discussed in greater detail below. Histogram formation block 28 is preferably addressable with the number of bits corresponding to the number of pixels in a line, with each memory location having a sufficient number of bits to correspond to the number of lines in a frame, and histogram formation block 29 is preferably addressable with the number of bits corresponding to the number of lines in a frame, with each memory location having a sufficient number of bits to correspond to the number of pixels in a line.

Figure 12:
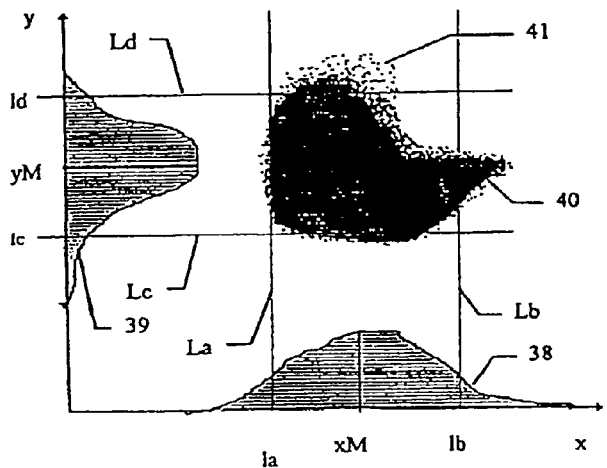
FIG. 12 shows the formation of a two-dimensional histogram of a moving area from two one-dimensional histograms.
Figure 13:
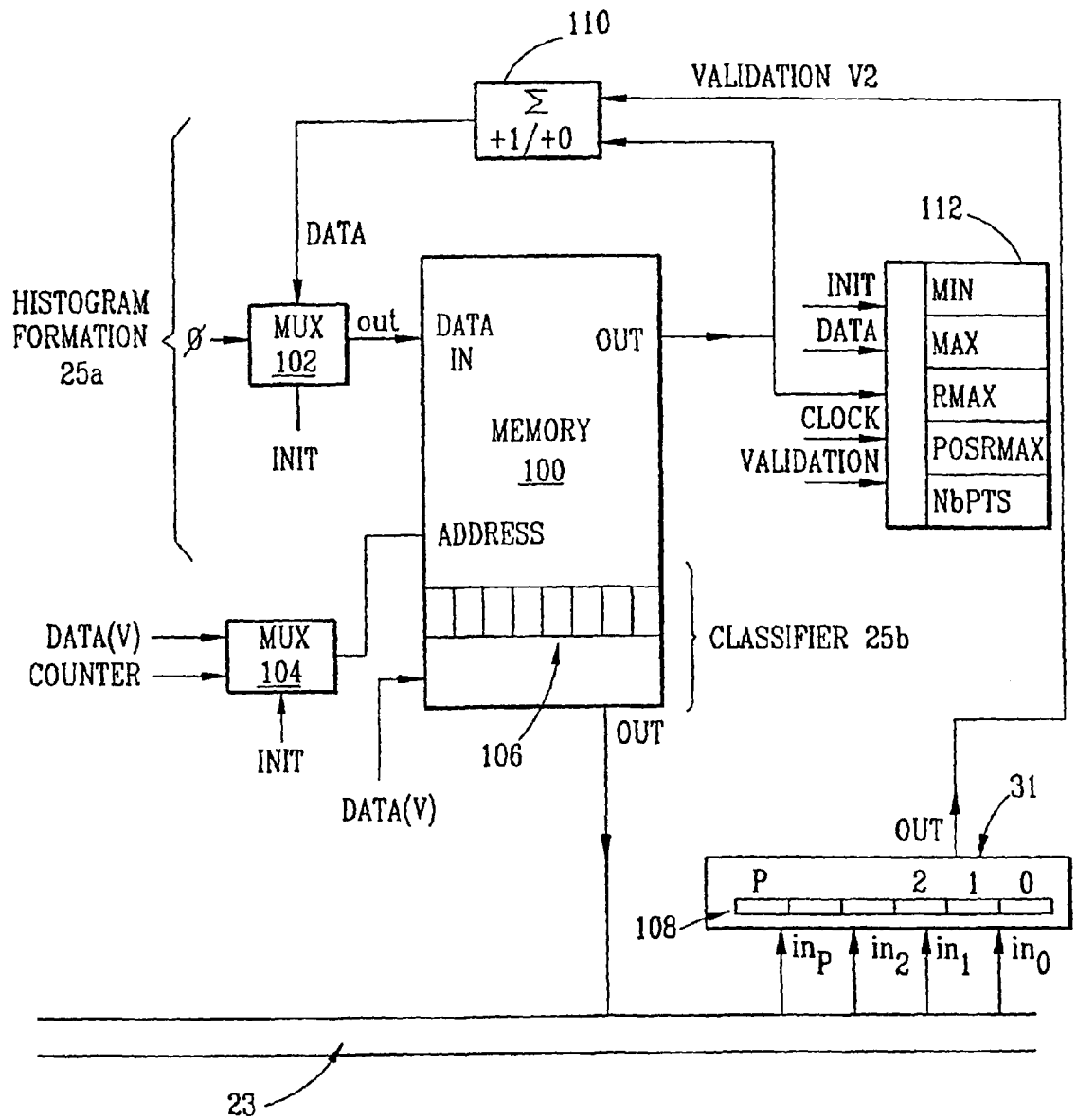
FIG. 13 is a block diagram of an individual histogram formation unit.

Referring to FIGS. 12 and 13, each of the histogram formation blocks 24-29 has an associated validation block 30-35 respectively, which generates a validation signal VI-V6 respectively. In general, each of the histogram formation blocks 24-29 is identical to the others and functions in the same manner. For simplicity, the invention will be described with respect to the operation of histogram formation block 25, it being appreciated that the remaining histogram formation blocks operate in a like manner. Histogram formation block 25 includes a histogram forming portion 25a, which forms the histogram for that block, and a classifier 25b, for selecting the criteria of pixels for which the histogram is to be formed. Histogram forming portion 25a and classifier 25b operate under the control of computer software in an integrated circuit 25c, which extracts certain limits of the histogram generated by the histogram formation block.

Referring to FIG. 13, histogram forming portion 25a includes a memory 100, which is preferably a conventional digital memory. In the case of histogram formation block 25 which forms a histogram of speed, memory 100 is sized to have addresses 0-7, each of which may store up to the number of pixels in an image. Between frames, memory 100 is initiated, i.e., cleared of all memory, by setting init=1 in multiplexors 102 and 104. This has the effect, with respect to multiplexor 102 of selecting the "0" input, which is output to the Data In line of memory 100. At the same time, setting init=1 causes multiplexor 104 to select the Counter input, which is output to the Address line of memory 100. The Counter input is connected to a counter (not shown) that counts through all of the addresses for memory 100, in this case 0<=address <=7. This has the effect of placing a zero in all memory addresses of memory 100. Memory 100 is preferably cleared during the blanking interval between each frame. After memory 100 is cleared, the init line is set to zero, which in the case of multiplexor 102 results in the content of the Data line being sent to memory 100, and in the case of multiplexor 104 results in the data from spatial processing unit 117, i.e., the V data, being sent to the Address line of memory 100.

Classifier 25b enables only data having selected classification criteria to be considered further, meaning to possibly be included in the histograms formed by histogram formation blocks 24-29. For example, with respect to speed, which is preferably a value in the range of 0-7, classifier 25b may be set to consider only data within a particular speed category or categories, e.g., speed 1, speeds 3 or 5, speed 3-6, etc. Classifier 25b includes a register 106 that enables the classification criteria to be set by the user, or by a separate computer program. By way of example, register 106 will include, in the case of speed, eight registers numbered 0-7. By setting a register to "1", e.g., register number 2, only data that meets the criteria of the selected class, e.g., speed 2, will result in a classification output of "1". Expressed mathematically, for any given register in which R(k)=b, where k is the register number and b is the Boolean value stored in the register:

$$\text{Output}=R(\text{data}(V))$$

So for a data point V of magnitude 2, the output of classifier 25b will be "1" only if R(2)=1. The classifier associated with histogram formation block 24 preferably has 256 registers, one register for each possible luminance value of the image. The classifier associated with histogram formation block 26 preferably has 8 registers, one register for each possible direction value. The classifier associated with histogram formation block 27 preferably has 8 registers, one register for each possible value of CO. The classifier associated with histogram formation block 28 preferably has the same number of registers as the number of pixels per line. Finally, the classifier associated with histogram formation block 29 preferably has the same number of registers as the number of lines per frame. The output of each classifier is communicated to each of the validation blocks 30-35 via bus 23, in the case of histogram formation blocks 28 an 29, through combination unit 36, which will be discussed further below.

Validation units 30-35 receive the classification information in parallel from all classification units in histogram formation blocks 24-29. Each validation unit generates a validation signal which is communicated to its associated histogram formation block 24-29. The validation signal determines, for each incoming pixel, whether the histogram formation block will utilize that pixel in forming it histogram. Referring again to FIG. 13, which shows histogram formation block 25, validation unit 31 includes a register block 108 having a register associated with each histogram formation block, or more generally, a register associated with each data domain that the system is capable of processing, in this case, luminance, speed, direction, CO, and x and y position. The content of each register in register block 108 is a binary value that may be set by a user or by a computer controller. Each validation unit receive via bus 23 the output of each of the classifiers, in this case numbered 0 . . . p, keeping in mind that for any data domain, e.g., speed, the output of the classifier for that data domain will only be "1" if the particular data point being considered is in the class of the registers set to "1" in the classifier for that data domain. The validation signal from each validation unit will only be "1" if for each register in the validation unit that is set to "1", an input of "I" is received from the classifier for the domain of that register. This may be expressed as follows:

$$out = (in_0 + Reg_0) \cdot (in_1 + Reg_1) \ldots (in_n + Reg_n) \cdot (in_0 + in_1 + \ldots in_n)$$

where $Reg_0$ is the register in the validation unit associated with input $in_0$. Thus, using the classifiers in combination with validation units 30-35, the system may select for processing only data points in any selected classes within any selected domains. For example, the system may be used to detect only data points having speed 2, direction 4, and luminance 125 by setting each of the following registers to "1": the registers in the validation units for speed, direction, and luminance, register 2 in the speed classifier, register 4 in the direction classifier, and register 125 in the luminance classifier. In order to form those pixels into a block, the registers in the validation units for the x and y directions would be set to "1" as well.

Referring again to FIG. 13, validation signal V2 is updated on a pixel-by-pixel basis. If, for a particular pixel, validation signal V2 is "1", adder 110 increments the output of memory 100 by one. If, for a particular pixel, validation signal V2 is "0", adder 100 does not increments the output of memory. In any case, the output of adder 100 is stored in memory 100 at the address corresponding to the pixel being considered. For example, assuming that memory 100 is used to form a histogram of speed, which may be categorized as speeds 0-7, and where memory 100 will include 0-7 corresponding memory locations, if a pixel with speed 6 is received, the address input to multiplexor 104 through the data line will be 6. Assuming that validation signal V2 is "1", the content in memory at location 6 will be incremented. Over the course of an image, memory 100 will contain a histogram of the pixels for the image in the category associated with the memory. If, for a particular pixel, validation signal V2 is "0" because that pixel is not in a category for which pixels are to be counted (e.g., because that pixel does not have the correct direction, speed, or luminance), that pixel will not be used in forming the histogram.

For the histogram formed in memory 100, key characteristics for that histogram are simultaneously computed in a unit 112. Unit 112 includes memories for each of the key characteristics, which include the minimum (MIN) of the histogram, the maximum (MAX) of the histogram, the number of points (NBPTS) in the histogram, the position (POSRMAX) of the maximum of the histogram, and the number of points (RMAX) at the maximum of the histogram. These characteristics are determined in parallel with the formation of the histogram as follows:

For each pixel with a validation signal V2 of "1":

(a) if the data value of the pixel<MIN (which is initially set to the maximum possible value of the histogram), then write data value in MIN, (b) if the data value of the pixel>MAX (which is initially set to the minimum possible value of the histogram), then write data value in MAX;

(c) if the content of memory 100 at the address of the data value of the pixel>RMAX (which is initially set to the minimum possible value of the histogram), then i) write data value in POSRMAX and ii) write the memory output in RMAX.

(d) increment NBPTS (which is initially set to zero).

At the completion of the formation of the histogram in memory 100 at the end of each frame, unit 112 will contain important data characterizing the histogram. The histogram in each memory 100, and the characteristics of the histogram in units 112 are read during the scanning spot of each frame by a separate processor, and the memories 100 are cleared and units 112 are re-initialized for processing the next frame.

Figure 14:
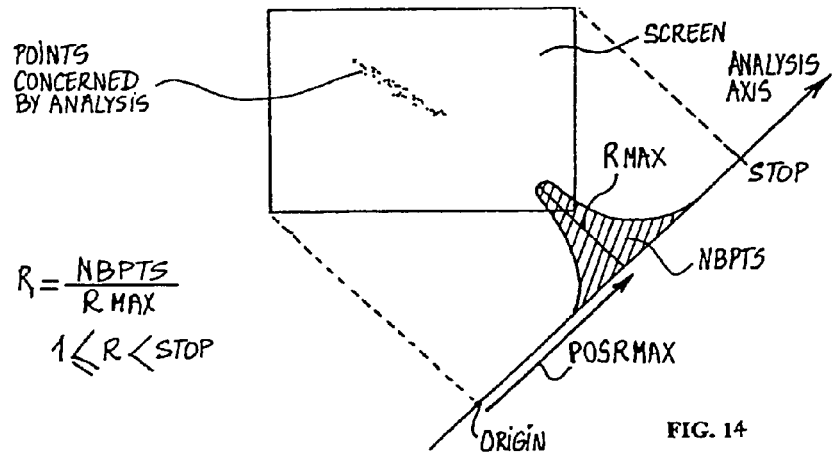
FIG. 14 illustrates the use of the classifier for finding an alignment of points relative to the direction of an analysis axis.

FIG. 14 shows the determination of the orientation of an alignment of points relative to the direction of an analysis axis.

In this figure, the analysis axis extends with an angle relative to the horizontal side of the screen and the histogram built along the analysis axis refers to points concerned by the analysis appearing on the screen.

For the histogram calculation device five particular values are calculated:

MIN, MAX, NBPTS, RMAX, POSRMAX

The use of these values allows to obtain some rapid results.

For example, the calculation of the ratio NBPTS/RMAX i.e. the number of points involved in the histogram and the number of points in the maximal line allows to find an alignment of points perpendicular to the scanning axis.

The smaller is R and the most the alignment is perpendicular to the scanning axis.

One improvement of the calculation for example for positioning a vehicle on the road is to carryout for each pixel simultaneously an analysis according all the possible analysis axis. In an analysis region, the calculation of the ration R for all the analysis axes and the search of the smallest value of R allows to find the axis perpendicular of the analyzed points and consequently to know the alignment with a positioning, from the value POSRMAX.

Presently the map is divided by 16 (180°/16).

The use of the moving pixels histogram, direction histogram and velocity histograms allows to find by reading POSRMAX the overall motion of the scene (moving camera) and in the classifying unit to inhibit these preponderant classes.

The device thus becomes responsive to elements which are subject to relative motion in the image. The use of histograms according to two perpendicular axes with these elements in relative motion as validation element allows to detect and track an object in relative motion.

The calculation of the histogram according to a projection axis is carried out in a region delimited by the associated classifier between points a and b on the analysis axis.

An important improvement is to associate anticipation by creating an histogram of the same points with orientation and intensity of motion as input parameters. The nominal values O-MVT corresponding to orientation of the movement and I-MVT corresponding to intensity of movement allow to modify the values a and b of the classifier of the unit connected to the calculation of the analysis axis for the calculation for the next frame.

Figure 14A:
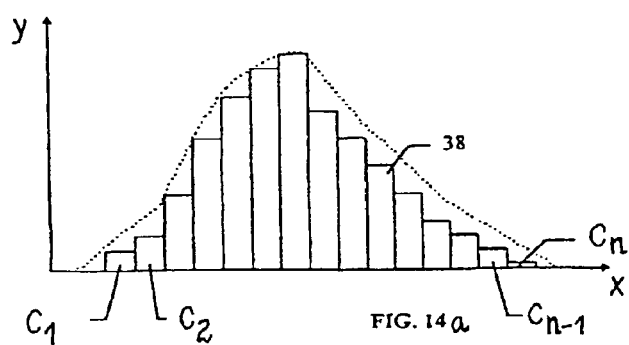
FIG. 14a illustrates a one-dimensional histogram.

The result is greatly improved. FIG. 14a shows an example of the successive classes $C_1 C_2 \ldots C_{n-1} C_n$, each representing a particular velocity, for a hypothetical velocity histogram, with their being categorization for up to 16 velocities (15 are shown) in this example. Also shown is envelope 38, which is a smoothed representation of the histogram.

In order to locate the position of an object having user specified criteria within the image, histogram blocks 28 and 29 are used to generate histograms for the x and y positions of pixels with the selected criteria. These are shown in FIG. 12 as histograms along the x and y coordinates. These x and y data are output to moving area formation block 36 which combines the abscissa and ordinal information $x(m)_2$ and $y(m)_2$ respectively into a composite signal xy(m) that is output onto bus 23. A sample composite histogram 40 is shown in FIG. 12. The various histograms and composite signal xy(m) that are output to bus 23 are used to determine if there is a moving area in the image, to localize this area, and/or to determine its speed and oriented direction. Because the area in relative movement may be in an observation plane along directions x and y which are not necessarily orthogonal, (e.g., as discussed below with respect to FIGS. 15 and 16), a data change block 37 may be used to converts the x and y data to orthogonal coordinates. Data change block 37 receives orientation signals $x(m)_0$ and $y(m)_0$ for $x(m)_0$ and $y(m)_0$ axes, as well as pixel clock signals HP, line sequence and column sequence signals SL and SC (these three signals being grouped together in bundle F in FIGS. 2,4, and 10) and generates the orthogonal $x(m)_1$ and $y(m)_1$ signals that are output to histogram formation blocks 28 and 29 respectively.

In order to process pixels only within a user-defined area, the x-direction histogram formation unit may be set to process pixels only in a class of pixels defined by boundaries, i.e. XMIN and XMAX. Any pixels outside of this class will not be processed. Similarly, the y-direction histogram formation unit may be set to process pixels only in a class of pixels defined by boundaries YMIN and YMAX. Thus, the system can process pixels only in a defined rectangle by setting the XMIN and XMAX, and YMIN and YMAX values as desired. Of course, the classification criteria and validation criteria from the other histogram formation units may be set in order to form histograms of only selected classes of pixels in selected domains in selected areas.

FIG. 12 diagrammatically represents the envelopes of histograms 38 and 39, respectively in x and y coordinates, for velocity data. In this example, $x_M$ and $Y_M$ represent the x and y coordinates of the maxima of the two histograms 38 and 39, whereas $l_a$ and $l_b$ for the x axis and $l_c$ and $l_d$ for the y axis represent the limits of the range of significant or interesting speeds, $l_a$ and $l_c$ being the longer limits and $l_b$ and $l_d$ being the upper limited of the significant portions of the histograms. Limits $l_a$, $l_b$, $l_c$ and $l_d$ may be set by the user or by an application program using the system, may be set as a ratio of the maximum of the histogram, e.g., $X_M/2$, or may be set as otherwise desired for the particular application.

The vertical lines $L_a$ and $L_b$, of abscises $l_a$ and $l_b$ and the horizontal lines $L_c$ and $L_d$ of ordinals $l_c$ and $l_d$ form a rectangle that surrounds the cross hatched area 40 of significant speeds (for all x and y directions). A few smaller areas 41 with longer speeds, exist close to the main area 40, and are typically ignored. In this example, all that is necessary to characterize the area with the largest variation of the parameter for the histogram, the speed V in this particular case, is to identify the coordinates of the limits $l_a$, $l_b$, $l_c$ and $l_d$ and the maxima $X_M$ and $y_M$, which may be readily derived for each histogram from memory 100, the data in units 112, and the xy(m) data block.

Thus, the system of the invention generates in real time, histograms of each of the parameters being detected. Assuming that it were desired to identify an object with a speed of "2" and a direction of "4", the validation units for speed and direction would be set to "1", and the classifiers for speed "2" and direction "4" would be set to "1". In addition, since it is desired to locate the object(s) with this speed and direction on the video image, the validation signals for histogram formation blocks 28 and 29, which correspond to the x and y coordinates, would be set to "1" as well. In this way, histogram formation blocks 28 and 29 would form histograms of only the pixels with the selected speed and direction, in real-time. Using the information in the histogram, and especially POSRMAX, the object with the greatest number of pixels at the selected speed and direction could be identified on the video image in real-time. More generally, the histogram formation blocks can localize objects in real-time meeting user-selected criteria, and may produce an output signal, e.g., a light or a buzzer if an object is detected. Alternatively, the information may be transmitted, e.g., by wire, optical fiber or radio relay for remote applications, to a control unit, such as unit 10a in FIG. 1, which may be near or remote from image processing system 11.

Figure 15:
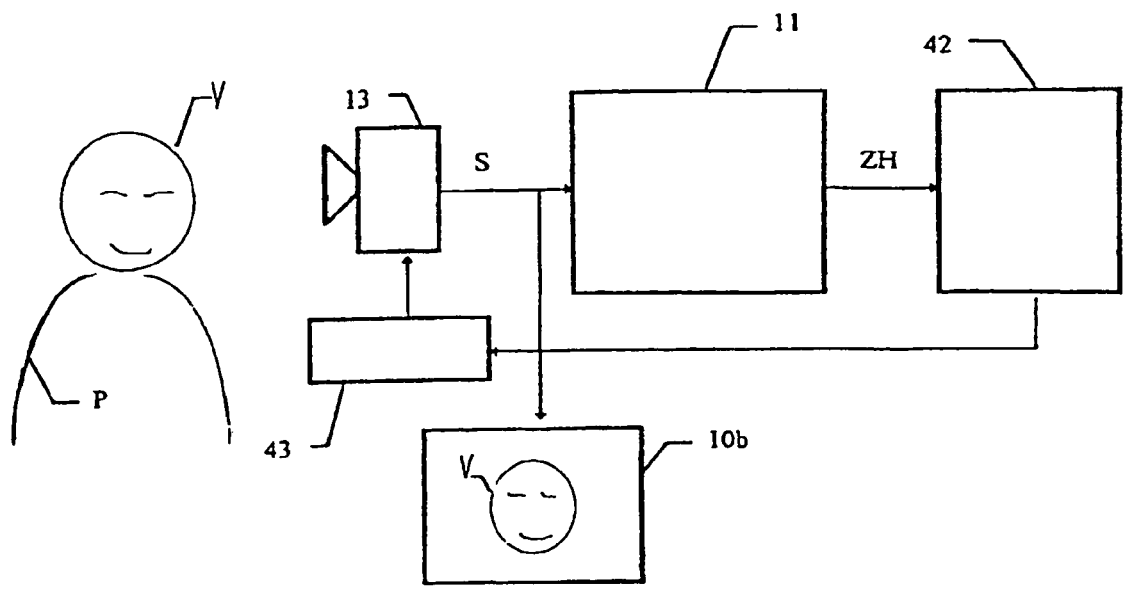
FIG. 15 illustrates the use of the system of the invention for video-conferencing.
Figures 16, 17:
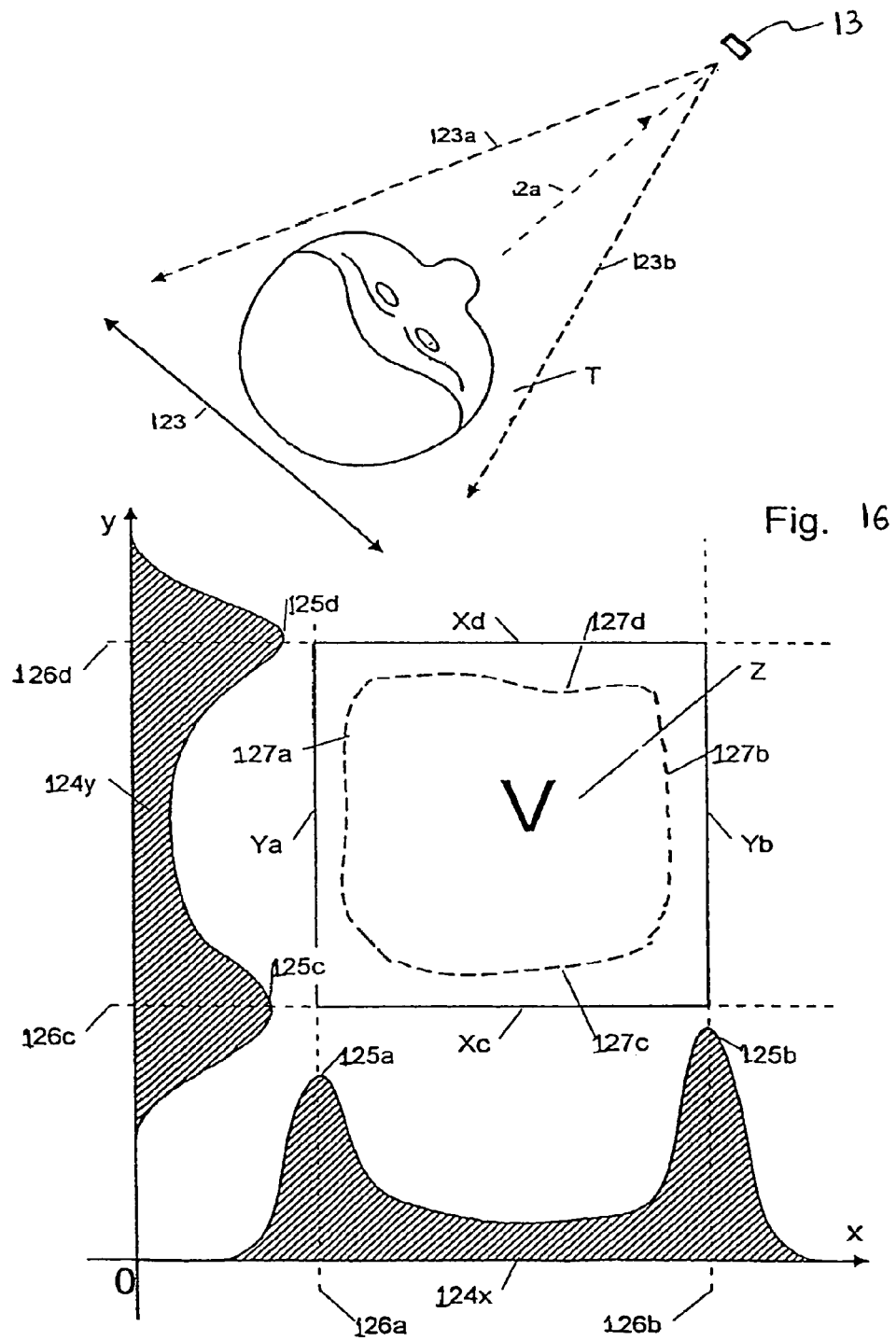
FIG. 16 is a top view of the system of the invention for video-conferencing.
FIG. 17 is a diagram illustrating histograms formed on the shape of the head of a participant in a video conference.

FIG. 15 shows an example of use of the system of the invention to perform automatic framing of a person moving, for example, during a video conference. A video camera 13 observes the subject P, who may or may not be moving. A video signal S from the video camera is transmitted by wire, optical fiber, radio relay, or other communication means to a monitor 10b and to the image processing system of the invention 11. The image processing system determines the position and movement of the subject P, and controls servo motors 43 of camera 13 to direct the optical axis of the camera towards the subject and particularly towards the face of the subject, as a function of the location, speed and direction of the subject, and may vary the zoom, focal distance and/or the focus of the camera to provide the best framing and image of the subject.

Figure 18:
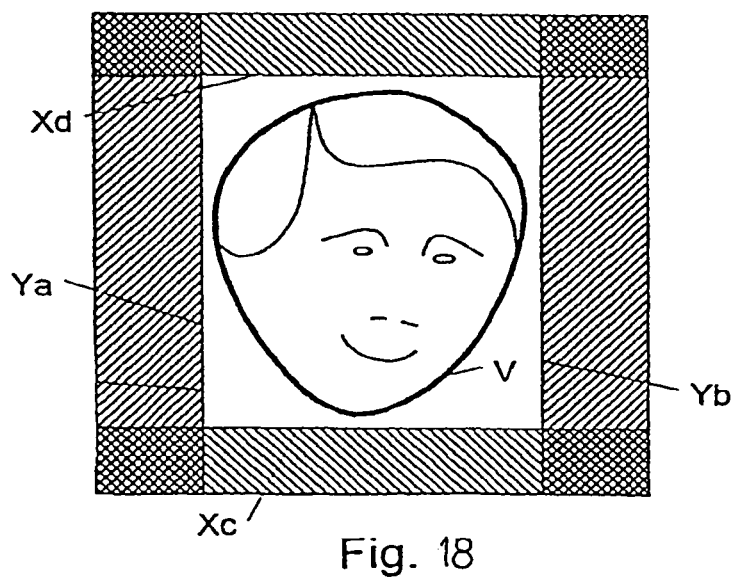
FIG. 18 illustrates the system of the invention eliminating unnecessary information in a video-conferencing application.

Referring to FIG. 18, the system of the invention may be used to center the face of the subject in the video signal while eliminating superfluous portions of the image received by the camera 13 above, below, and to the right and left of the head of the subject. Camera 13 has a field of view 123, which is defined between directions 123a and 123b. The system rotates camera 13 using servomotors 43 so that the head T of the subject is centered on central axis 2a within cortical field 123, and also adjusts the zoom of camera 13 to ensure that the head T of the subject occupies a desired amount of the frames of the video signal, preferably as represented by a desired ratio of the number of pixels comprising head T to the total number of pixels per frame.

In order to accomplish this, the system of the invention may focus on the head using its luminance or motion. By way of example only, the system will be described with respect to detecting the head of the user based upon its motion. The peripheral edges of the head of the user are detected using the horizontal movements of the head, in other words, movements right and left, and the vertical movements, in other words, movements up and down. As the horizontal and vertical motion of the head is determined by the system, it is analyzed using preferred coordinate axes, preferably Cartesian coordinates Ox and Oy, in moving, area block 36 (FIG. 11).

The pixels with greatest movement within the image will normally occur at the peripheral edges of the head of the subject, where even due to slight movements, the pixels will vary between the luminance of the head of the subject and the luminance of the background. Thus, if the system of the invention is set to identify only pixels with DP=1, and to form a histogram of these pixels, the histogram will detect movement peaks along the edges of the face where variations in brightness, and therefore in pixel value, are the greatest, both in the horizontal projection along Ox and in the vertical projection along Oy.

This is illustrated in FIG. 17m which axes Ox and Oy are shown, as are histograms 124x, along Ox, and 124y, along Oy, i.e., in horizontal and vertical projections, respectively. Histograms 124x and 124y would be output from histogram formation units 28 and 29 respectively (FIG. 11). Peaks 125a and 125b of histogram 124x, and 125c and 125d of histogram 124y, delimit, by their respective coordinates 126a, 126b, 126c and 126d, a frame bounded by straight lines Ya, Yb, Xc, and Xd, which encloses the face V of the video-conference participant, and which denote areas 127a, 127b, 127c and 127d, which are areas of slight movement of the head T, which will be the areas of greatest variation in pixel intensity during these movements.

Location of the coordinates 126a, 126b, 126c and 126d, corresponding to the four peaks 125a, 125b, 125c and 125d, is preferably determined by computer software reading the x and y coordinate histograms during the spot scanning sequence of each frame. The location of the coordinates 126a, 126b, 126c and 126d of peaks 125a, 125b, 125c and 125d of histograms 124x and 124y make it possible to better define and center the position of the face V of the subject in the image. In a video conferencing system, the remainder of the image, i.e. the top bottom, right and left portions of the image, as illustrated in FIG. 18 by the cross-hatched areas surrounding the face V, may be eliminated to reduce the bandwidth required to transmit the image. The center of face V may be determined, for example, by locating the pixel position of the center of the box bounded by Ya, Yb, Xc, and Xd ((Xc+(Xd−Xc)/2), (Ya+(Yb−Ya)/2)) and by comparing this position to a desired position of face V on the screen. Servomotors 43 (FIG. 13) are then actuated to move camera 13 to better center face V on the screen. Similarly, if face V is in movement, the system may detect the position of face V on the screen as it moves, and follow the movement by generating commands to servomotors 43.

If desired, the center position of face V may be determined at regular intervals, and preferably in each frame, and the average value (over time) of coordinates 126a, 126b, 126c and 126d used to modify the movement of camera 13 to center face V.

With face V centered, the system may adjust the zoom of camera 13 so that face V covers a desired amount of the image. The simples method to accomplish this zoom function is to determine the dimensions of (or number of pixels in) the box bounded by Ya, Yb, Xc, and Xd. Camera 13 may then be zoomed in or out until desired dimensions (or pixel count) are achieved.

Figure 19:
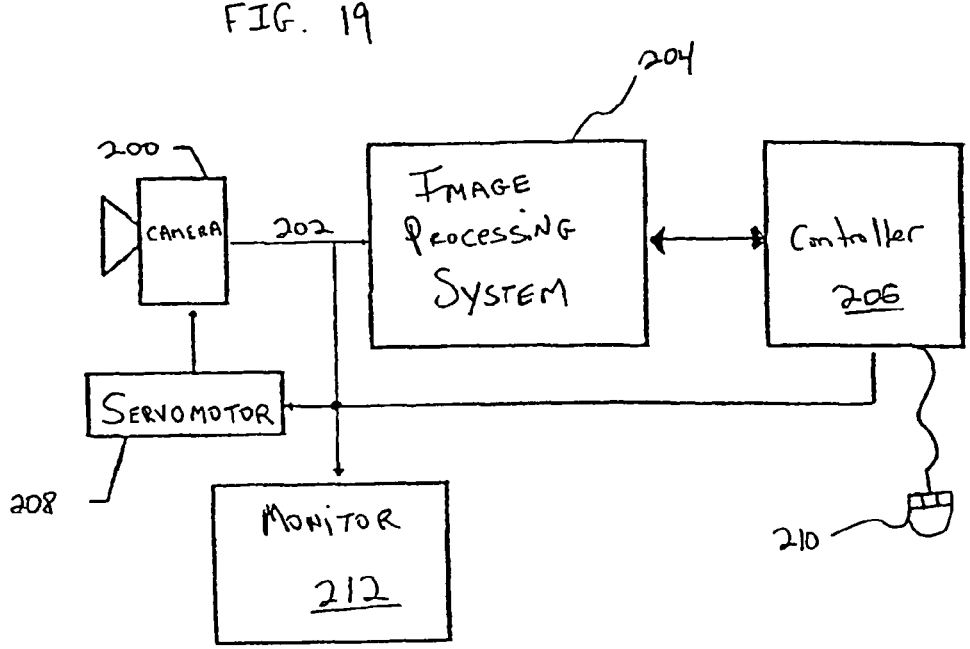
FIG. 19 is a block diagram showing use of the system of the invention for target tracking.

Another application of the invention relates to automatic tracking of a target by, for example, a spotlight or a camera. Using a spotlight, the invention might be used on a helicopter to track a moving target on the ground, or to track a performer on a stage during an exhibition. The invention would similarly be applicable to weapons targeting systems. Referring to FIG. 19, the system includes a camera 200, which is preferably a conventional CCD camera which communicates an output signal 202 to image processing system 204 of the invention. Especially for covert and military applications, it will be appreciated that the system may be used with sensor such as Radar and IR, in lieu of, or in combination with, camera 200. A controller 206, which is preferably a conventional microprocessor-based controller, is used to control the various elements of the system and to enable user input of commands and controls, such as with computer mouse 210, a keyboard (not shown), or other input device. As in the prior embodiment, the system includes one or more servomotors 208 that control movement of camera 200 to track the desired target. It will be appreciated that any appropriate means may be used to control the area of interest of camera 200, including use of moving mirrors relative to a fixed camera, and the use of a steered beam, for example in a Radar system, to track the target without physically moving the sensor.

Figure 20:
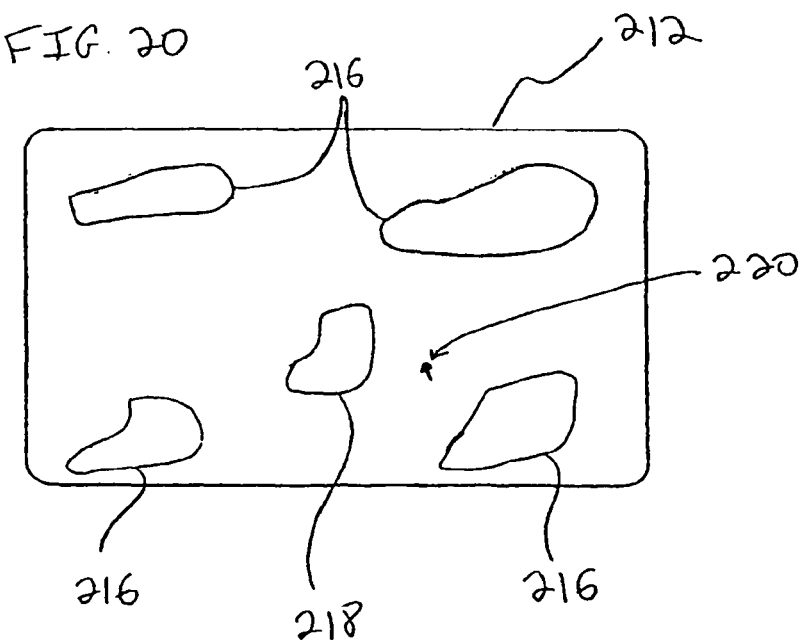
FIG. 20 is an illustration of the system of the invention selecting a target for tracking.

In the example shown in FIG. 20, monitor 212 is shown with five simulated objects, which may be, for example, vehicles, or performers on a stage, including four background targets 216, and one target to be tracked 218. Computer mouse 210 is used to control an icon 220 on monitor 212. The user of the system selects the target for tracking by moving icon 220 over target 218, and depressing a predetermined button on mouse 210. The pixel position of icon 220 is then used as a starting position for tracking target 216.

Figure 21:
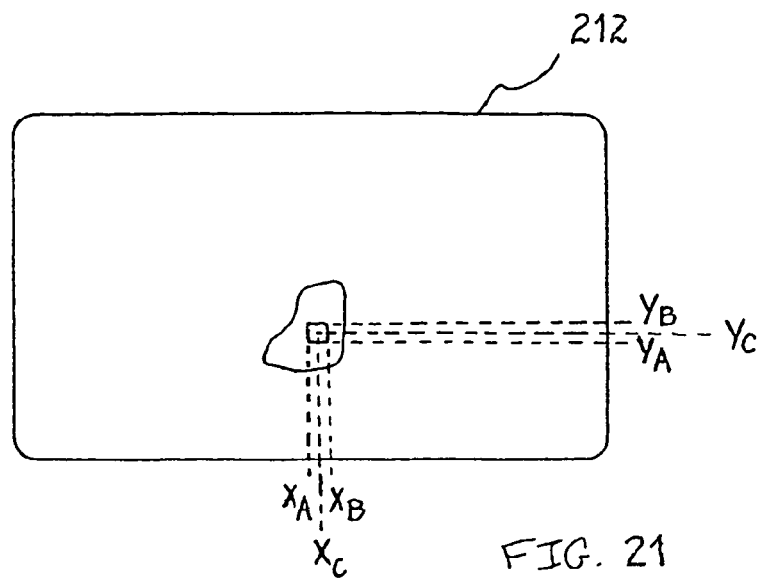

Referring to FIG. 21, the initial pixel starting position is shown as $x_c$, $y_c$. In order to process the pixels surrounding the starting position, image processing system 204 will process the pixels in successively larger areas surrounding the pixel, adjusting the center of the area based upon the shape of the object, until substantially the entire target area is being tracked. The initial area is set by controller 206 to include an area bounded by $X_A$, $X_B$, $Y_C$, $Y_D$. This is accomplished by setting these boundaries in the classification units of x and y histogram formation units 28 and 29. Thus, the only pixels that will be processed by the system are those falling within the bounded area. Assuming that in the example given, the target is in motion. the system may be set to track pixels with DP=1. Those pixels with DP=1 would normally be located on the peripheral edges of target 218, unless the target had a strong color or luminance variation throughout, in which case, many of the pixels of the target would have DP=1. In any case, in order to locate pixels with DP=1, the validation units would be set to detect pixels with DP=1. Thus, the only pixels that will be considered by the system are those in the bounded area with DP=1. Alternatively, the system may be set to detect a velocity greater than zero, or any other criteria that define the edges of the object.

Histograms are then formed by x and y histogram formation units 28 and 29. In the example shown in FIG. 21, an insignificant number of pixels would be identified as having DP=I, since the selected area does not include the border of target 218, so no histogram would be formed. The size of the area under consideration is then successively increased, preferably by a constant size K, so that in subsequent iterations, the pixels considered would be in the box bounded by $X_{A-nK}$, $X_{B-nK}$, $y_{A-nK}$, $y_{B+nK}$, where n is the number of the current iteration.

Figure 22:
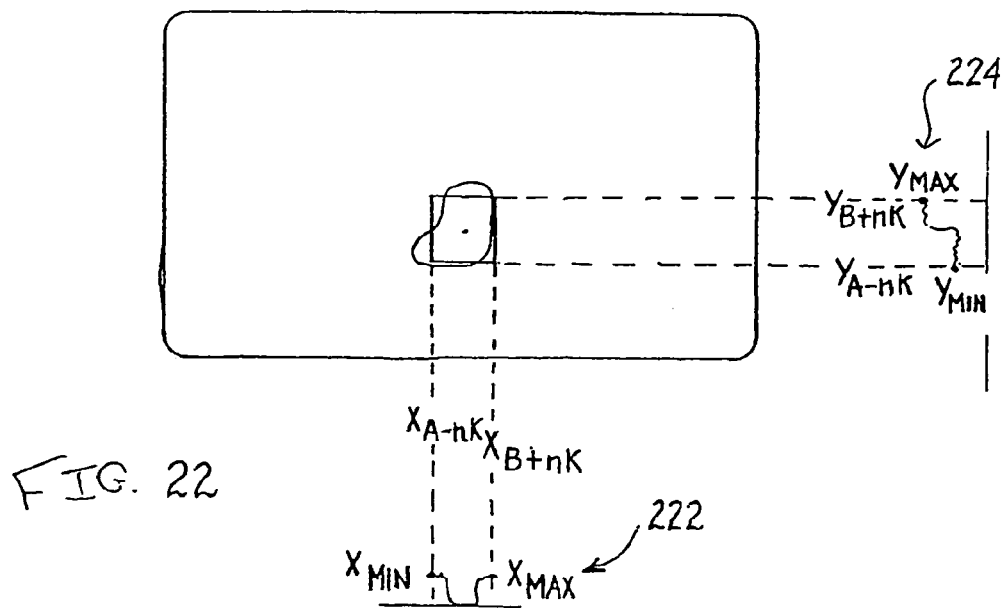

This process is continued until the histogram formed by either of histogram formation units 28 and 29 contains meaningful information, i.e., until the box overlaps the boundary of the target. Referring to FIG. 22, when the area under consideration begins to cross the borders of target 218, the histograms 222 and 224 for the x and y projections will begin to include pixels in which DP=1 (or any other selected criteria to detect the target edge). Prior to further enlarging the area under consideration, the center of the area under consideration, which until this point has been the pixel selected by the user, will be adjusted based upon the content of histograms 222 and 224. In a preferred embodiment, the new center of the area is determined to be $(X_{MIN}+X_{MAX})/2$, $(Y_{MIN}+Y_{MAX})/2$, where $X_{MIN}$ and $X_{MAX}$ are the positions of the minima and maxima of the x projection histogram, and $Y_{MIN}$ and $Y_{MAX}$ are the positions of the minima and maxima of the y projection histogram. This serves to adjust the area under consideration for the situation in which the initial starting position is nearer to one edge of the target than to another. Other methods of relocating the center of the target box may be used if desired.

Figure 23:
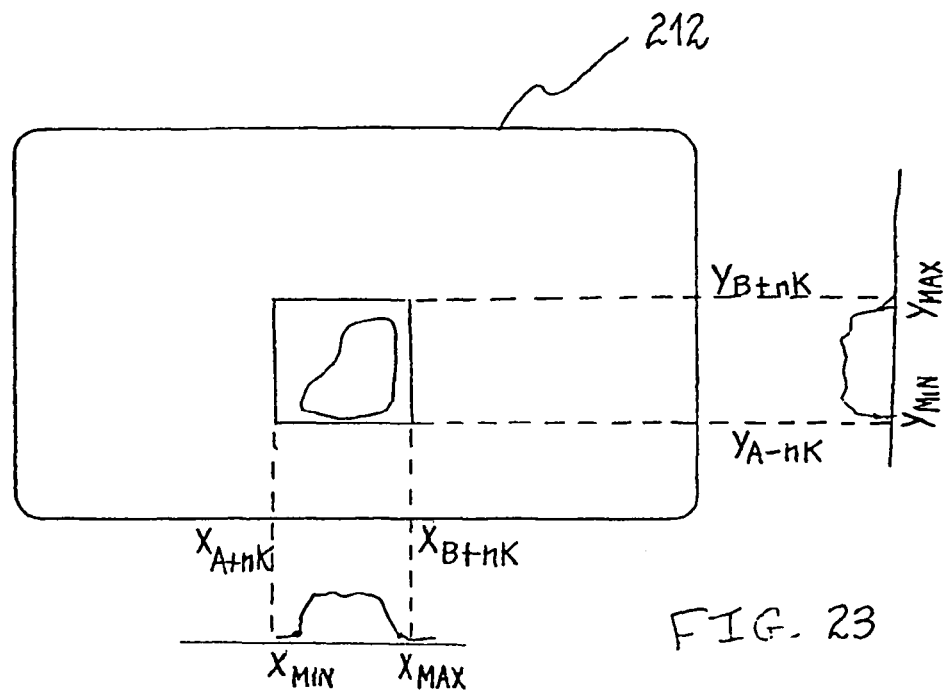
FIGS. 21-23 illustrate the system of the invention locking on to a selected target.

After additional iterations, as shown in FIG. 23, it being understood that the center of the box bounding the area of consideration may have moved from the prior iteration, the box will be larger than the target in that $X_{A-nK}<X_{MIN}$, $X_{A+nK}>X_{MAX}$, $Y_{A-nK}<Y_{MIN}$, and $Y_{A+nK}>Y_{MAX}$. When this occurs, the entire target is bounded, and the constant K may then be reduced, to thereby reduce the size of the tracking box. In a preferred embodiment, when initially tracking a target, constant K is preferably relatively large, e.g., 10-20 pixels or more, in order that the system may lock on the target expeditiously. Once a target has been locked onto, K may be reduced. It will be appreciated that in the course of tracking a target, the tracking box will be enlarged and reduced as appropriate to maintain a track of the target, and is preferably adjusted on a frame by-frame basis.

Assuming that the system is to be used to train a spotlight on the target, for example from an airborne vehicle or in a theater, the camera is preferably synchronized with the spotlight so that each is pointing at the same location. In this way, where the camera has centered the target on its image, the spotlight will be centered on the target. Having acquired the target, controller 206 controls servomotors 208 to maintain the center of the target in the center of the image. For example, if the center of the target is below and to the left of the center of the image, the camera is moved downward and to the left as required to center the target. The center of the target may be determining in real time from the contents of POSRMAX for the x and histogram formation units.

It will be appreciated that as the target moves, the targeting box will move with the target, constantly adjusting the center of the targeting box based upon the movement of the target, and enlarging and reducing the size of the targeting box. The targeting box may be displayed on monitor 212, or on another monitor as desired to visually track the target.

A similar tracking box may be used to track an object in an image based upon its characteristics. For example, assuming it is desired to track a target moving only to the right in the image. The histogram formation units are set up so that the only validation units set to "1" are for direction and for the x and y projections. The classification unit for direction is set so that only direction "right" is set to "1". The histograms for the x and y projections will then classify only pixels moving to the right. Using these histograms, a box bounding the target may be established. For example, referring to FIG. 12, the box surrounding the target may be established using $l_a$, $l_b$, $l_c$ and $l_d$ as the bounds of the box. The target box may be displayed on the screen using techniques known in the art.

After a very short initialization period on the order of about 10 frames, the invention determines the relative displacement parameters instantaneously after the end of each frame on which the temporal and spatial processing was performed due to the recursive ness of calculations according to the invention.

The invention, including components 11a and 22a is preferably formed on a single integrated circuit, or on two integrated circuits. If desired, a micro controller, for enabling user-input to the system, e.g., to program the validation and classification units, may be integrated on the same integrated circuit.

It will be appreciated that the present invention is subject to numerous modifications. In an embodiment in which a color camera is used, the system of the invention preferably includes histogram formation units for hue and saturation. This enables classification of targets to be made using these characteristics as well. In fact, the invention may be modified by adding histogram formation units for any possible other measurable characteristics of the pixels. Moreover, while the invention has been described with respect to tracking a single target, it is foreseen that multiple targets may be tracked, each with user-defined classification criteria, by replicating the various elements of the invention. For example, assuming the system of the invention included additional histogram formation units for hue and saturation, the system could be programmed, using a common controller attached to two histogram formation processors of the type shown in FIG. 11, to track a single target by its velocity, and/or color, and/or direction, etc. In this manner, the system could continue to track a target if, for example, the target stopped and the track based upon velocity and direction was lost, since the target could still be tracked by color.

It will also be appreciated that the limitation of eight speeds may be increased by using a greater bit count to represent the speeds. Moreover, while the invention has been described with respect to detection of eight different directions, it may be applied to detect 16 or more directions by using different size matrices, e.g., sixteen directions may be detected in a 5×5 matrix, to detect a greater number of directions.

Figure 24:
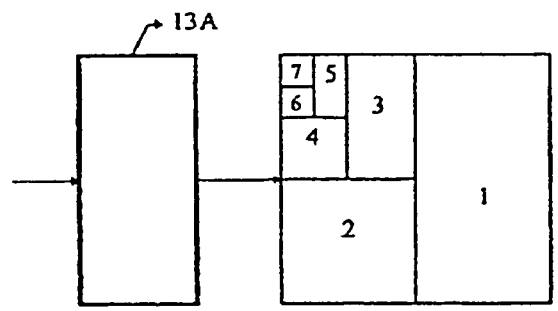
FIG. 24 illustrates the processing of the system using a Mallat diagram.

Finally, FIG. 24 shows a method of tracking a wider range of speeds V if the limited number provided by p bits for time constant CO is insufficient. Using Mallat's diagram (see article by S. Mallat "A Theory for multi-resolution signal decomposition" in IEEE Transactions on Pattern Analysis and Machine Intelligence, July 1989 p. 674-693), the video image is successively broken down into halves, identified as 1, 2, 3, 4, 5, 6, 7. This creates a compression that only processes portions of the image. For example, with $p=4$ ($2^P=16$), the system may determine speeds within a wider range.

If initially, while processing the entire image, the system determines that the speed of an object exceeds the maximum speed determinable with $2^P=16$ for the time constant, the system uses partial observed images 1, 2, 3, 4, ... until the speed of the object does not exceed the maximum speed within the partial image after compression. To use Mallat compression with wavelets, a unit 13A (FIG. 24) is inserted into the system shown in FIG. 1 to perform the compression. For example, this unit could be composed of the "DV 601 Low Cost Multiformat Video Codec" by Analog Devices. FIG. 2 shows an optional compression unit 13a of this type.

Although the present invention has been described with respect to certain embodiments and examples, variations exist that are within the scope of the invention as described in the following claims.

The invention claimed is:

1. A process of tracking a target provided in an input signal received by an image processing system, the image processing system being configured for receiving the input signal, which input signal includes data regarding a succession of frames, and each frame including a plurality of pixels, a portion of the plurality of pixels including the target, the process comprising:
  calculating a histogram boundary for an area defined within the portion of the plurality of pixels containing the target;
  analyzing the calculated histogram boundary to determine whether the area contains the target in its entirety;
  adjusting the histogram boundary for the area defined within the portion of the plurality of pixels containing the target until the adjusted histogram boundary contains the target in its entirety; and
  setting the calculated histogram boundary based on predefined criteria,
  wherein the predefined criteria includes coordinates (Xmin, Ymin) and (Xmax, Ymax), and wherein calculating the histogram boundary comprises:
    calculating an x histogram dimension for pixels from Xmin to Xmax;
    calculating a y histogram dimension for pixels from Ymin to Ymax; and
    analyzing the calculated x and y histograms dimension to determine whether the x and y histogram dimensions contain target information,
    wherein analyzing the x and y histogram dimensions comprises performing a thresholding operation, wherein the area defined by the histogram boundary is defined by coordinates (Xmin, Ymin) and (Xmax, Ymax), and wherein adjusting the location of the center comprises defining a new center of the histogram boundary at coordinate ((Xmin+Xmax)/2, (Ymin+Ymax)/2).

2. The process of claim 1, wherein the adjusted histogram boundary is adapted to a size of the target.

3. The process of claim 1, wherein the adjusted histogram boundary is defined to be successively larger.

4. The process of claim 1, wherein analyzing the calculated histogram boundary further comprises determining a location of a center of the calculated histogram boundary, and adjusting the histogram boundary further comprises adjusting the location of the center of the histogram boundary.

5. The process of claim 1, further comprising repeating the steps of calculating a histogram boundary, analyzing the calculated histogram, and adjusting the histogram boundary for a subsequent, second frame so as to track the target in the second frame.

6. The process of claim 1, wherein the pixels containing the target are received from a camera, and wherein adjusting the location of the center includes moving the camera so as to move the location of the center.

7. The process of claim 1, further comprising displaying a targeting box around the target on a monitor.

8. A target tracking system for determining, according to an initial area including a target to be tracked in an image captured by a camera, a targeting box surrounding a starting position of a frame, the target tracking system comprising:
  an x histogram unit for forming a histogram based on predetermined x pixels of the targeting box;
  a y histogram unit for forming a histogram based on predetermined y pixels of the targeting box; and
  a controller for specifying dimensions of the targeting box bounded by the predetermined x pixels and y pixels, the controller adjusting the dimensions of the targeting box starting with the initial area and, in accordance with the histogram formed by the x and y histogram units, adjusting the dimensions until the target tracking system detects at least one edge of the target,
  wherein the targeting box is defined by coordinates (Xmin, Ymin) and (Xmax, Ymax), such that
    the x histogram unit calculates an x histogram dimension based on pixels from Xmin to Xmax, and
    the y histogram unit calculates a y histogram dimension based on pixels from Ymin to Ymax, and
    wherein the controller is configured to analyze the calculated x and y histogram dimensions to determine whether the x and y histogram dimensions contain target information,
    wherein the controller is configured to analyze the calculated x and y histogram dimensions by performing a thresholding operation.

9. The target tracking system of claim 8, wherein the controller adjusts the dimensions of the targeting box by defining successively larger areas surrounding the starting position.

10. The target tracking system of claim 8, wherein the controller is configured to analyze the calculated x and y histogram dimensions by performing a thresholding operation.

11. The target tracking system of claim 10, wherein the area defined by the targeting box is bounded by coordinates (Xmin, Ymin) and (Xmax, Ymax), and wherein adjusting the location of the center of the targeting box includes defining a new center of the targeting box at coordinate ((Xmin+Xmax)/2, (Ymin+Ymax)/2).

12. The target tracking system of claim 8, further comprising a camera that provides the x and y pixels of the targeting box, and wherein adjusting the location of the center of the targeting box includes moving the camera so as to move the location of the center of the targeting box.

13. The target tracking system of claim 8, further comprising a monitor for displaying the targeting box relative to the initial area.

14. The target tracking system of claim 12, further comprising a servomotor for adjusting an orientation of the camera in accordance with the calculated x and y histogram dimensions.

* * * * *